US012090118B2

(12) United States Patent
Christie et al.

(10) Patent No.: US 12,090,118 B2

(45) Date of Patent: Sep. 17, 2024

(54) CAP DESIGN FOR PHARMACEUTICAL CONTAINER CLOSURE SYSTEMS

(71) Applicant: CORNING INCORPORATED, Corning, NY (US)

(72) Inventors: Dane Alphanso Christie, Painted Post, NY (US); Adam Robert Sarafian, Corning, NY (US); Jiangtao Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 129 days.

(21) Appl. No.: 17/992,412

(22) Filed: Nov. 22, 2022

(65) Prior Publication Data

US 2023/0157927 A1 May 25, 2023

Related U.S. Application Data

(60) Provisional application No. 63/281,826, filed on Nov. 22, 2021.

(51) Int. Cl.
*A61J 1/14* (2023.01)
*A61J 1/06* (2006.01)
(Continued)

(52) U.S. Cl.
CPC ............. *A61J 1/1412* (2013.01); *A61J 1/065* (2013.01); *A61J 1/1468* (2015.05); *B65B 7/2821* (2013.01); *B65D 41/28* (2013.01)

(58) Field of Classification Search
CPC .............................. A61J 1/1412; A61J 1/1468
See application file for complete search history.

(56) References Cited

U.S. PATENT DOCUMENTS 3,653,528 A 4/1972 Wimmer
3,659,736 A 5/1972 Riggs
(Continued)

FOREIGN PATENT DOCUMENTS

CA 3138450 A1 11/2020
EP 3708137 A1 9/2020
(Continued)

OTHER PUBLICATIONS

International Search Report and Written Opinion of the International Searching Authority; PCT/US2022/049078; mailed on Feb. 28, 2023, 15 pages; European Patent Office.
(Continued)

*Primary Examiner* — Daniel Jeremy Leeds
(74) *Attorney, Agent, or Firm* — F. Brock Riggs

(57) ABSTRACT

Caps for sealing assemblies for sealing glass containers and maintaining container closure integrity at −80° C. or less are disclosed. The caps include a cap skirt having an annular body and a crimp region. The crimp region is a crimpable metal. The annular body of the cap skirt has a coefficient of thermal expansion (CTE) greater than a CTE of a metal consisting of aluminum, a stiffness greater than or equal to 2 times a stiffness of the crimp region, or both. The greater CTE, stiffness, or both of the cap skirt increase the seal pressure and contact area between the stopper and glass container when cooled to −80° C. or less. The caps enable the sealing assemblies to maintain a helium leakage rate of the sealed glass container of less than or equal to $1.4\times10^{-6}$ $cm^3/s$ at −80° C. or less.

27 Claims, 18 Drawing Sheets

(51) Int. Cl.
*B65B 7/28* (2006.01)
*B65D 41/28* (2006.01)

(56) References Cited

U.S. PATENT DOCUMENTS

| | | | |
|---|---|---|---|
| 4,205,754 | A | 6/1980 | Jarsskov et al. |
| 4,244,478 | A | 1/1981 | Handman |
| 4,664,277 | A | 5/1987 | Connor |
| 5,064,083 | A | 11/1991 | Alexander et al. |
| 5,772,057 | A | 6/1998 | Finneran |
| 5,817,082 | A | 10/1998 | Niedospial, Jr. et al. |
| 5,902,298 | A | 5/1999 | Niedospial et al. |
| 6,090,093 | A | 7/2000 | Thibault et al. |
| 6,645,635 | B2 | 11/2003 | Muraki |
| 7,282,269 | B2 | 10/2007 | Wang et al. |
| 8,092,878 | B2 | 1/2012 | Miller et al. |
| 8,497,004 | B2 | 7/2013 | Davis et al. |
| 8,544,665 | B2 | 10/2013 | Bogle et al. |
| 8,551,898 | B2 | 10/2013 | Danielson et al. |
| 8,684,206 | B2 | 4/2014 | Kawachi |
| 9,080,044 | B2 | 7/2015 | Muto |
| 9,145,329 | B2 | 9/2015 | Drake et al. |
| 9,744,099 | B2 | 8/2017 | Fadeev et al. |
| 10,450,214 | B2 | 10/2019 | McEnroe et al. |
| 10,780,021 | B2 | 9/2020 | Weikart et al. |
| 11,168,019 | B2 | 11/2021 | Schaut et al. |
| 2002/0023409 | A1 | 2/2002 | Py |
| 2002/0166326 | A1 | 11/2002 | Giesy et al. |
| 2003/0177629 | A1 | 9/2003 | Thibault et al. |
| 2007/0246468 | A1 | 10/2007 | Miller et al. |
| 2009/0145427 | A1 | 6/2009 | Groeger et al. |
| 2010/0236659 | A1 | 9/2010 | Py et al. |
| 2010/0273049 | A1 | 10/2010 | Vidal et al. |
| 2015/0211950 | A1 | 7/2015 | Eckhoff et al. |
| 2015/0344557 | A1 | 12/2015 | Malik et al. |
| 2016/0009460 | A1 | 1/2016 | Fournier et al. |
| 2016/0075485 | A1 | 3/2016 | Masuyama et al. |
| 2016/0324723 | A1 | 11/2016 | Lippert et al. |
| 2018/0257975 | A1 | 9/2018 | Kimura et al. |
| 2020/0146280 | A1 | 5/2020 | Silverman et al. |
| 2020/0156991 | A1 | 5/2020 | Allington et al. |
| 2020/0271541 | A1 | 8/2020 | Mathaes et al. |
| 2021/0002016 | A1 | 1/2021 | Langsdorf et al. |
| 2021/0212893 | A1 | 7/2021 | Christie et al. |
| 2022/0168185 | A1 | 6/2022 | Redkar et al. |
| 2022/0339067 | A1 | 10/2022 | Christie et al. |

FOREIGN PATENT DOCUMENTS

| | | | |
|---|---|---|---|
| FR | 0484903 | A | 11/1917 |
| FR | 2558444 | A1 | 7/1985 |
| JP | 10-179688 | A | 7/1998 |
| JP | 2010-209157 | A | 9/2010 |
| WO | 2013/034594 | A1 | 3/2013 |
| WO | 2019/213746 | A1 | 11/2019 |
| WO | 2020/112634 | A1 | 6/2020 |
| WO | 2020/231474 | A2 | 11/2020 |
| WO | 2021/042090 | A2 | 3/2021 |
| WO | 2021/162984 | A1 | 8/2021 |
| WO | 2022/020120 | A1 | 1/2022 |

OTHER PUBLICATIONS

International Search Report and Written Opinion of the International Searching Authority; PCT/US22/41311; mailed on Nov. 22, 2022, 14 pages; European Patent Office.

"Molding Innovation into healthcare packaging", Retrieved from: https://www.araymond-life.com/en, ARaymond Life + Schott plastic cap for cold storage CCI presentation at PDA Conference (Mar. 2020), 4 pages.

Brigitte Zuleger et al., Container/Closure Integrity Testing and the Identification of a Suitable Vial/Stopper Combination for Low-Temperature Storage at -80° C., 2012, PDA JPST, vol. 66, Abstract (Year: 2012).

Duncan et al., Correlating Vial Seal Tightness to Container Closure Integrity at Various Storage Temperatures, Aug. 25, 2015, available at https://www.pharmaceuticalonline.com/doc/correlating-vial-seal-tightness-to-container-closure-integrity-at-various-storage-temperatures-0001. pp. 1-31.

Ethylene-Propylene Rubbers & Elastomers, Apr. 20, 2012, International Institute of Synthetic Rubber Producers, Inc. (Year: 2012).

Hagart-Alexander, C., Temperature Measurement, 2010, Elsevier Inc., pp. 269-271 (Year: 2010).

Iacocca, R., "Primary container design for drug substance and drug substance at Cryo- and cold temperatures," Presented at the 2019 PDA Europe Parenteral Packaging, Venice, Italy, Mar. 19, 2019. pp. 1-22.

Mathaes, R., et al. (2016). "The pharmaceutical vial capping process: Container closure systems, capping equipment, regulatory framework, and seal quality tests", Elsevier, Eur J Pharm Biopharm 99 (2016) 54-64. DOI: http:/dx.doi.org/10.1016/j.ejpb.2015.11.016.

Nieto, A. and H. Roehl (2018). "Sealing Behaviour of Container Closure Systems under Frozen Storage Conditions: Nonlinear Finite Element Simulation of Serum Rubber Stoppers." PDA J Pharm Sci and Tech (2018), 72(4): 367-381. DOI: 10.5731/pdajpst.2017.008391.

Sircoulomb et al., "Cryogenic Storage Challenges for Container-Closure Systems," Mar. 25, 2020, available at https://www.pda.org/pda-letter-portal/home/full-article/cryogenic-storage-challenges-for-container-closure-systems. pp. 1-7.

CAP DESIGN FOR PHARMACEUTICAL CONTAINER CLOSURE SYSTEMS

This application claims the benefit of priority under 35 U.S.C. § 119 of U.S. Provisional Application Ser. No. 63/281,826, filed on Nov. 22, 2021, the content of which is relied upon and incorporated herein by reference in its entirety.

TECHNICAL FIELD

The present specification generally relates to container closure systems, such as glass or plastic containers for storing pharmaceutical products or biological materials.

BACKGROUND

Pharmaceutical containers, such as vials and syringes, are typically sealed via a stopper or other closure to preserve the integrity of the contained material. Closures, such as stoppers are typically made of synthetic rubbers and other elastomers. The stoppers are generally held in place with a cap crimped to the pharmaceutical container. Some biological materials (e.g., blood, serum, proteins, stem cells, and other perishable biological fluids) require storage at low temperatures, such as temperatures less than −45° C., less than −80° C., or even less than −180° C. For example, certain RNA-based vaccines may require storage at dry-ice temperatures (e.g., approximately −80° C.) or liquid nitrogen temperatures (e.g., approximately −180° C.) to remain active. Such low temperatures may result in dimensional changes in the closure components (e.g., the glass or plastic container, the stopper, an aluminium cap), leading to issues in the integrity of the seal, and potential contamination of the material stored therein.

SUMMARY

A first aspect of the present disclosure includes a cap for a sealing a pharmaceutical glass container. The cap comprises a cap skirt comprising an annular body and a crimp region at a first end of the annular body. The cap further comprises a top cover coupled to a second end of the cap skirt, the top cover comprising a solid disc or annular disc. The crimp region may comprise a crimpable metal. The annular body of the cap skirt comprises a coefficient of thermal expansion (CTE) greater than a CTE of a metal consisting of aluminum, a stiffness greater than or equal to 2 times a stiffness of the crimp region, or both. The CTE refers to the CTE at 20° C., and stiffness is defined as a Young's modulus times a cross-sectional area divided by an axial length.

A second aspect of the present disclosure may include the first aspect, wherein the CTE of the annular body of the cap skirt may be greater than the CTE of the metal consisting of aluminum by a difference of at least $100\times10^{-7}$ $K^{-1}$.

A third aspect of the present disclosure may include either one of the first or second aspects, wherein the CTE of the annular body of the cap skirt may be greater than or equal to $260\times10^{-7}$ $K^{-1}$, greater than or equal to $280\times10^{-7}$ $K^{-1}$, greater than or equal to $300\times10^{-7}$ $K^{-1}$, greater than or equal to $350\times10^{-7}$ $K^{-1}$, greater than or equal to $400\times10^{-7}$ $K^{-1}$, greater than or equal to $500\times10^{-7}$ $K^{-1}$, or even greater than or equal to $1{,}00\times10^{-7}$ $K^{-1}$.

A fourth aspect of the present disclosure may include any one of the first through third aspects, wherein the CTE of the annular body of the cap skirt may be greater than or equal to $260\times10^{-7}$ $K^{-1}$ at a temperature less than or equal to the glass transition temperature of a stopper, such as less than or equal to −45° C.

A fifth aspect of the present disclosure may include any one of the first through fourth aspects, wherein the stiffness of the annular body of the cap skirt may be greater than or equal to 2 times a stiffness of a comparable cap skirt annular body consisting of aluminum metal and having a radial thickness of 0.19 mm and identical axial length.

A sixth aspect of the present disclosure may include any one of the first through fifth aspects, further comprising a stopper, wherein the stiffness of the annular body of the cap skirt may be within 30% of a stiffness of the stopper in a compressed state at temperatures less than or equal to the glass transition temperature $T_g$ of the stopper.

A seventh aspect of the present disclosure may include any one of the first through sixth aspects, wherein the annular body of the cap skirt may have a Young's modulus of greater than or equal to 140 GPa, a radial thickness greater than or equal to 0.24 mm, or both.

An eighth aspect of the present disclosure may include any one of the first through seventh aspects, wherein the CTE of the annular body of the cap skirt may be greater than $260\times10^{-7}$ $K^{-1}$ and the stiffness of the annular body is greater than 2 times a stiffness of a comparable cap skirt annular body consisting of aluminum metal and having a radial thickness of 0.19 mm and identical axial length.

A ninth aspect of the present disclosure may include any one of the first through eighth aspects, wherein the crimpable metal of the crimp region may comprise aluminum or an aluminum alloy.

A tenth aspect of the present disclosure may include any one of the first through ninth aspects, wherein the annular body of the cap skirt may comprise a metal or metal alloy having a CTE greater than the CTE of a metal consisting of aluminum.

An eleventh aspect of the present disclosure may include the tenth aspect, wherein the cap skirt may comprise a metal or metal alloy comprising one or more of zinc, aluminum, magnesium, copper, lithium, or combinations of these.

A twelfth aspect of the present disclosure may include any one of the first through eleventh aspects, wherein the cap skirt may comprise a polymer-metal composite structure.

A thirteenth aspect of the present disclosure may include the twelfth aspect, wherein the annular body of the cap skirt may comprise a polymer material and the crimp region may comprise the crimpable metal coupled to the polymer material of the annular body.

A fourteenth aspect of the present disclosure may include the thirteenth aspect, wherein the polymer material of the annular body may have a CTE of from $260\times10^{-7}$ $K^{-1}$ to $3{,}000\times10^{-7}$ $K^{-1}$, such as from $280\times10^{-7}$ $K^{-1}$ to $3{,}000\times10^{-7}$ $K^{-1}$, or even from $300\times10^{-7}$ $K^{-1}$ to $3{,}000\times10^{-7}$ $K^{-1}$.

A fifteenth aspect of the present disclosure may include either one of the thirteenth or fourteenth aspects, wherein the annular body of the cap skirt may have a stiffness that is greater than or equal to 80% of a stiffness of a comparable cap skirt annular body consisting of aluminum metal and having a radial thickness of 0.19 mm and identical axial length.

A sixteenth aspect of the present disclosure may include any one of the thirteenth through fifteenth aspects, wherein the plastic material may comprise high density polyethylene, acrylonictile butadiene styrene copolymer, polypropylene, ultra-high molecular weight polyethylene, or combinations thereof.

A seventeenth aspect of the present disclosure may include any one of the first through sixteenth aspects, wherein the cap skirt may comprise an attachment flange disposed at a second end of the annular body and the top cover may be coupled to the attachment flange of the cap skirt.

An eighteenth aspect of the present disclosure may include the seventeenth aspect, wherein the top cover may be removable from the cap skirt.

A nineteenth aspect of the present disclosure may include any one of the first through eighteenth aspects, wherein the top cover may be formed integral with the annular body of the cap skirt to form a unitary cap.

A twentieth aspect of the present disclosure may include any one of the first through nineteenth aspects, wherein the top cover may comprise the annular disc having an axial opening in a center of the top cover.

A twenty-first aspect of the present disclosure may include any one of the first through twentieth aspects and may be directed to a sealed pharmaceutical container. The sealed pharmaceutical container comprises a glass container comprising a shoulder, a neck extending from the shoulder, and a flange extending from the neck. The flange comprises an underside surface extending from the neck, an outer surface extending from the underside surface, the outer surface defining an outer diameter of the flange, and a sealing surface extending between the outer surface and an inner surface defining an opening in the sealed pharmaceutical container. The sealed pharmaceutical container further comprises a sealing assembly comprising a stopper extending over the sealing surface of the flange of the glass container and covering the opening, and the cap of any one of the first through twentieth aspects. The cap secures the stopper to the flange. The sealing assembly maintains a helium leakage rate of the sealed pharmaceutical container of less than or equal to $1.4\times10^{-6}$ $cm^3/s$ as the sealed pharmaceutical container is cooled to a temperature of less than or equal to −45° C.

A twenty-second aspect of the present disclosure may include the twenty-first aspect, wherein the stopper may have a glass transition temperature ($T_g$) that is greater than or equal to −70° C. and less than or equal to −45° C.

A twenty-third aspect of the present disclosure may include the twenty-first aspect, wherein a glass transition temperature of the stopper may be less than or equal to −75° C.

A twenty-fourth aspect of the present disclosure may include any one of the twenty-first through twenty-third aspects, wherein the sealing assembly may maintain the helium leakage rate of the sealed pharmaceutical container of less than or equal to $1.4\times10^{-6}$ $cm^3/s$ as the sealed pharmaceutical container is cooled to a temperature of less than or equal to −80° C., less than or equal to −100° C., less than or equal to −120° C., or even less than or equal to −180° C.

A twenty-fifth aspect of the present disclosure may include any one of the twenty-first through twenty-fourth aspects, wherein the glass container may be constructed of a glass composition having a coefficient of thermal expansion that is greater than or equal to 0 and less than or equal to $70\times10^{-7}$ $K^{-1}$.

A twenty-sixth aspect of the present disclosure may include any one of the twenty-first through twenty-fifth aspects, wherein an absolute value of the difference between the CTE of the cap skirt and a CTE of the stopper may be less than or equal to $50\times10^{-7}$ $K^{-1}$.

A twenty-seventh aspect of the present disclosure may include any one of the twenty-first through twenty sixth aspects, wherein the CTE of the annular body of the cap skirt may be greater than a CTE of the stopper.

A twenty-eighth aspect of the present disclosure may include any one of the twenty-first through twenty-ninth aspects, wherein the annular body of the cap skirt may have a stiffness that is within 30% of a stiffness of the compressed rubber stopper at temperatures less than or equal to the glass transition temperature $T_g$ of the stopper.

A twenty-ninth aspect of the present disclosure may include any one of the twenty-first through twenty-eighth aspects, wherein the sealed pharmaceutical container may maintain the helium leakage rate at is less than or equal to $1.4\times10^{-6}$ $cm^3/s$ as it is cooled to the temperature at a rate of less than or equal to 5° C. per minute.

A thirtieth aspect of the present disclosure may include the twenty-ninth aspect, wherein the cap may maintain continuous compression of the stopper against the flange of the glass container as the sealed pharmaceutical container is cooled.

A thirty-first aspect of the present disclosure may include any one of the twenty-first through thirtieth aspects, wherein the glass container may comprise an ion-exchangeable aluminosilicate glass, a Type 1B borosilicate glass, or a ion-exchangeable borosilicate glass.

A thirty-second aspect of the present disclosure may include any one of the first through thirty-first aspects and is directed to a method of sealing a sealed pharmaceutical container. The method comprises providing a pharmaceutical container comprising a shoulder, a neck extending from the shoulder and a flange extending from the neck. The flange may comprise an underside surface extending from the neck, an outer surface extending from the underside surface and defining an outer diameter of the flange, and an upper sealing surface extending from the outer surface to an inner surface of the sealed pharmaceutical container, wherein the inner surface defines an opening. The method may further include providing a sealing assembly comprising a stopper and the cap of any one of the first through twentieth aspects. The method may further include inserting a pharmaceutical composition into the pharmaceutical container, inserting the stopper into the opening so that the stopper extends over the upper sealing surface of the flange and covers the opening, and crimping the cap over the stopper and against the flange to thereby compress the stopper against the upper sealing surface. The method may further include cooling the sealed pharmaceutical container to a temperature of less than or equal to −45° C., wherein, after the cooling of the sealed pharmaceutical container, the compression is maintained on the sealing surface such that a helium leakage rate of the sealed pharmaceutical container is less than or equal to $1.4\times10^{-6}$ $cm^3/s$ at the temperature.

Additional features and advantages of the apparatus and methods described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
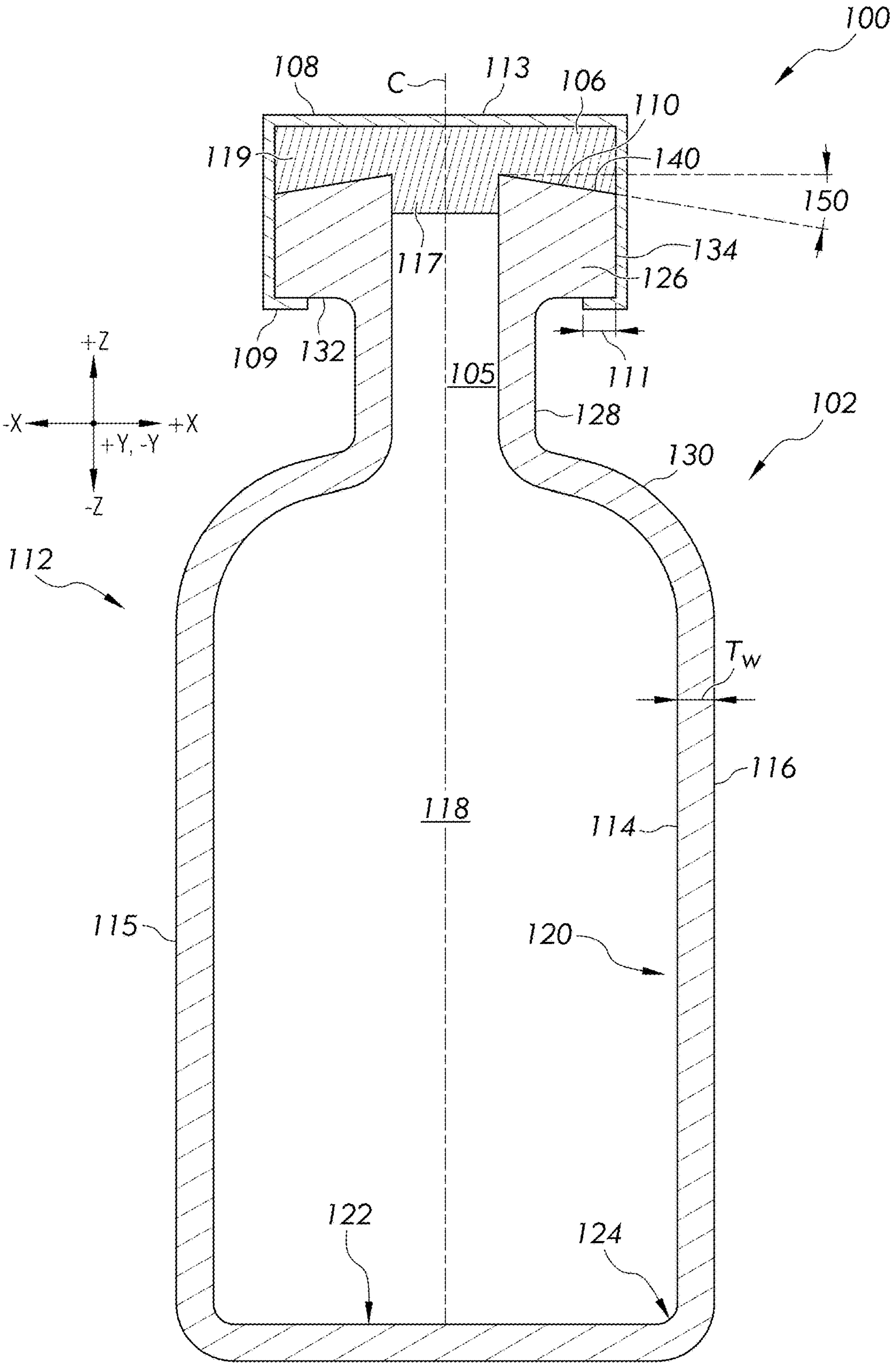
FIG. 1 schematically depicts a cross-sectional view of a sealed pharmaceutical container, according to one or more embodiments described herein.
Figure 5:
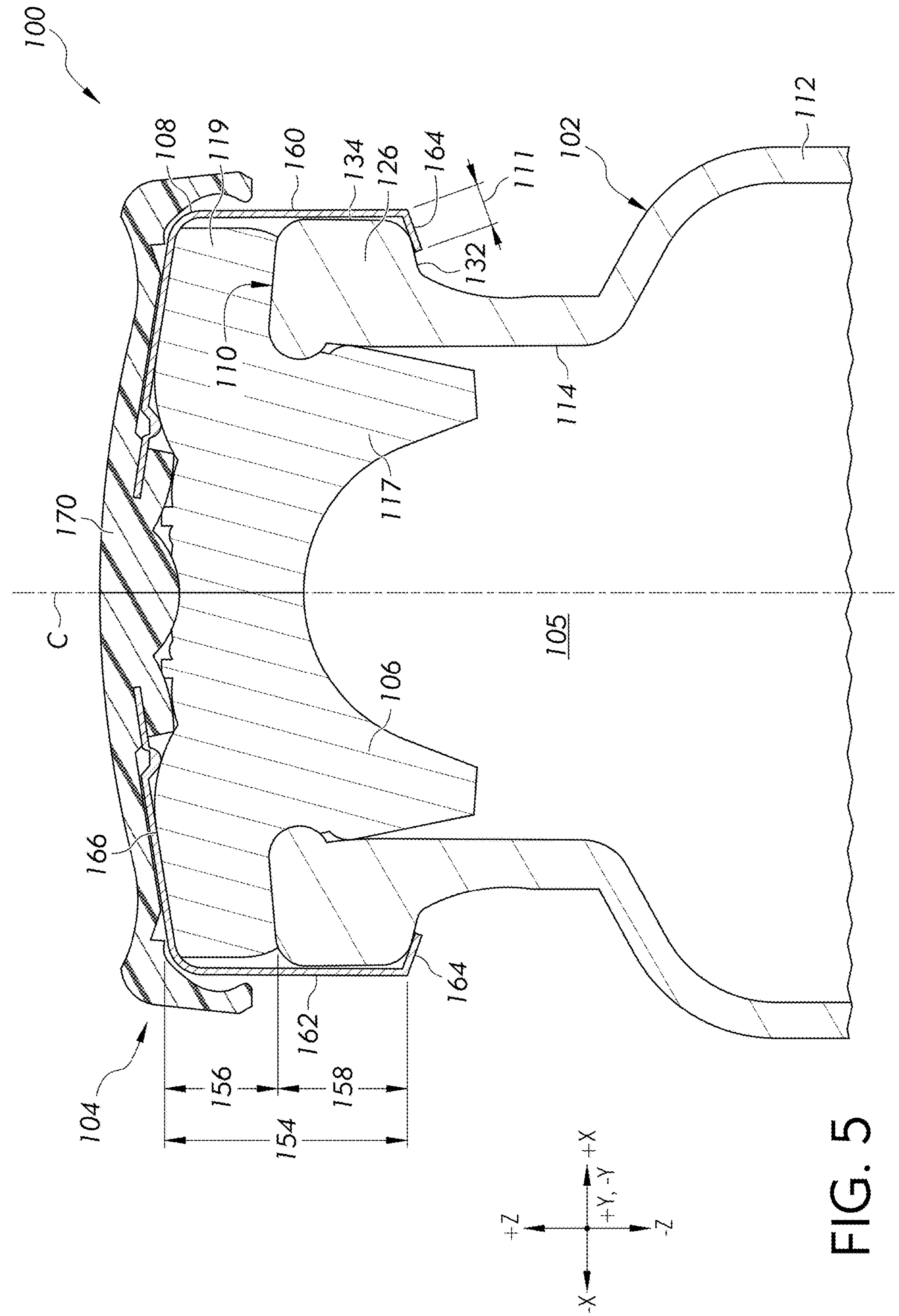
FIG. 5 schematically depicts a cross-sectional view of a sealing assembly of the sealed pharmaceutical container of FIG. 1, according to one or more embodiments described herein.

Reference will now be made in detail to embodiments of sealed glass containers comprising sealing assemblies that maintain container closure integrity at low storage temperatures (e.g., less than or equal to −40° C., less than or equal to −50° C., less than or equal to −60° C., less than or equal to −70° C., less than or equal to −80° C., less than or equal to −100° C., less than or equal to −125° C., less than or equal to −150° C., less than or equal to −175° C., less than or equal to −180° C.). Referring now to FIGS. 1 and 5, embodiments of a sealed glass container 100 are schematically depicted. The sealed glass container 100 includes a glass container 102 and a sealing assembly 104 comprising a stopper 106 and a cap 108. The present application is directed to designs for the cap 108 of the sealing assembly 104 that increase shrinkage of the cap 108 relative to the stopper 106 and flange 126 of the glass container 102, increase the stiffness of the cap 108, or both in order to maintain container closure integrity (CCI) at cryogenic storage temperatures, such as temperatures less than or equal to −80° C., less than or equal to −100° C., less than or equal to −125° C., less than or equal to −150° C., less than or equal to −175° C., or even less than or equal to −180° C. In embodiments, the cap 108 comprises a cap skirt 160 having a coefficient of thermal expansion (CTE) greater than a CTE of a metal consisting of aluminum, a stiffness greater than or equal to 2 times a stiffness of a comparable cap skirt annular body consisting of aluminum metal and having a radial thickness of 0.19 mm and identical axial length, or both. The increased CTE, increased stiffness, or both of the cap skirt 160 of the cap 108 may increase the contact area, sealing pressure, or both between the stopper 106 and an upper sealing surface 110 of the glass container 102 at temperatures less than or equal to −40° C., less than or equal to −50° C., less than or equal to −60° C., less than or equal to −70° C., less than or equal to −80° C., less than or equal to −100° C., less than or equal to −125° C., less than or equal to −150° C., less than or equal to −175° C., less than or equal to −180° C.

As used herein, the term "surface roughness" refers to an Ra value or an Sa value. An Ra value is a measure of the arithmetic average value of a filtered roughness profile determined from deviations from a centerline of the filtered roughness. For example, an Ra value may be determined based on the relation:

$$Ra = \frac{1}{n}\sum_{i=1}^{n}|H_i - H_{CL}|; \qquad (1)$$

where $H_i$ is a surface height measurement of the surface and Hu corresponds to a centerline (e.g., the center between maximum and minimum surface height values) surface height measurement among the data points of the filtered profile. An Sa value may be determined through an areal extrapolation of Equation 1 herein. Filter values (e.g., cutoff wavelengths) for determining the Ra or Sa values described herein may be found in ISO 25718 (2012). Surface height may be measured with a variety of tools, such as an optical interferometer, stylus-based profilometer, or laser confocal microscope. To assess the roughness of surfaces described herein (e.g., sealing surfaces or portions thereof), measurement regions should be used that are as large as is practical, to assess variability that may occur over large spatial scales.

As used herein, the term "container closure integrity" refers to maintenance of a seal at an interface between a glass container and a sealing assembly (e.g., between a sealing surface of a glass container and a stopper) that is free of gaps above a threshold size to maintain a probability of contaminant ingress or reduce the possibility of gas permeability below a predetermined threshold based on the material stored in a glass container. For example, in embodiments, a container closure integrity is maintained if a helium leakage rate during a helium leak test described in USP <1207> (2016) is maintained at less than or equal to $1.4\times10^{-6}$ $cm^3/s$.

As used herein, the term "cryogenic storage temperature" refers to temperatures at which biomaterial, such as plant or animal cells, can be stored with indefinite longevity to the cells, while minimizing the level of freezing damage. As used herein, the term "cryogenic storage temperature" refers to temperatures greater than or equal to −80° C.

In embodiments of the glass containers described herein, the concentration of constituent components (e.g., $SiO_2$, $Al_2O_3$, $B_2O_3$ and the like) of the glass composition from which the glass containers are formed are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp constituent in amounts of less than 0.05 mol. %.

The term "CTE," as used herein, refers to the coefficient of linear thermal expansion of a material at a temperature of 25° C., unless stated otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, one embodiment of a sealed glass container 100 for storing a pharmaceutical formulation is schematically depicted in cross-section. The sealed glass container 100 comprises a glass container 102 and a sealing assembly 104 coupled to the glass container 102 via an opening 105 of the glass container 102. The sealing assembly 104 comprises a stopper 106 and a cap 108. The stopper 106 may comprise an insertion portion 117 and a sealing portion 119. The insertion portion 117 may be inserted into the opening 105 of the glass container 102 until the sealing portion 119 contacts an upper sealing surface 110 of the glass container 102. The sealing portion 119 is then pressed against the upper sealing surface 110 via crimping of the cap 108 to the glass container 102 to form a seal at the upper sealing surface 110. Various aspects of the glass container 102 and the sealing assembly 104 are designed to ensure maintenance of container closure integrity of the glass container 102 at low storage temperatures, as described herein.

The glass container 102 generally comprises a body 112. The body 112 extends between an inner surface 114 and an outer surface 116 of the glass container 102 and includes a center axis C. The body 112 encloses an interior volume 118 of the glass container 102. In the embodiment of the glass container 102 shown in FIG. 1, the body 112 comprises a wall portion 120 and a floor portion 122. The wall portion 120 transitions into the floor portion 122 through a heel portion 124. In embodiments, the glass container 102 includes a flange 126, a neck 128 extending from the flange 126, a barrel 115, and a shoulder 130 extending between the neck 128 and the barrel 115. The floor portion 122 is coupled to the barrel 115 via the heel portion 124. In embodiments, the glass container 102 is symmetrical about the center axis C, with each of the barrel 115, neck 128, and flange 126, being substantially cylindrical-shaped.

The body 112 has a wall thickness $T_w$ which is defined as the distance between the inner surface 114 and the outer surface 116, as depicted in FIG. 1. The wall thickness $T_w$ of the glass container 102 may vary depending on the implementation. In embodiments, the wall thickness $T_w$ of the glass container 102 may be less than or equal to 6 millimetres (mm), such as less than or equal to 4 mm, less than or equal to 2 mm, less than or equal to 1.5 mm or less than or equal to 1 mm. In embodiments, the wall thickness $T_w$ may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness $T_w$ may be greater than or equal to 0.9 mm and less than or equal to 1.8 mm. The wall thickness $T_w$ may vary depending on the axial location within the glass container 102.

In embodiments, the glass container 102 may be formed from Type I, Type II or Type III glass as defined in USP <660>, including borosilicate glass compositions such as Type 1B borosilicate glass compositions under USP <660>. In embodiments, the glass container 102 may be formed from ion-exchangeable borosilicate glass composition, such as those described in co-pending U.S. application Ser. No. 16/533,954, filed Aug. 7, 2019 and entitled "Ion Exchangeable Borosilicate Glass Compositions and Glass Articles Formed from the Same" assigned to Corning Incorporated, hereby incorporated by references in its entirety. Alternatively, the glass container 102 may be formed from alkali aluminosilicate glass compositions such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass container 102 may be constructed from a soda lime glass composition. In embodiments, the glass container 102 is constructed of a glass composition having a coefficient of thermal expansion that is greater than or equal to 0 $K^{-1}$ and less than or equal to $100\times10^{-7}$ $K^{-1}$ (e.g., greater than or equal to $30\times10^{-7}$ $K^{-1}$ and less than or equal to $70\times10^{-7}$ $K^{-1}$). In embodiments, the glass container 102 may comprise a glass composition having a coefficient of thermal expansion that is greater than or equal to 0 $K^{-1}$ and less than or equal to $70\times10^{-7}$ $K^{-1}$.

While the glass container 102 is depicted in FIG. 1 as having a specific form-factor (i.e., a vial), it should be understood that the glass container 102 may have other form factors, including, without limitation, Vacutainers®, cartridges, syringes, ampoules, bottles, flasks, phials, tubes, beakers, or the like. Further, it should be understood that the glass containers 102 described herein may be used for a variety of applications including, without limitation, as pharmaceutical packages, beverage containers, or the like.

Figure 2:
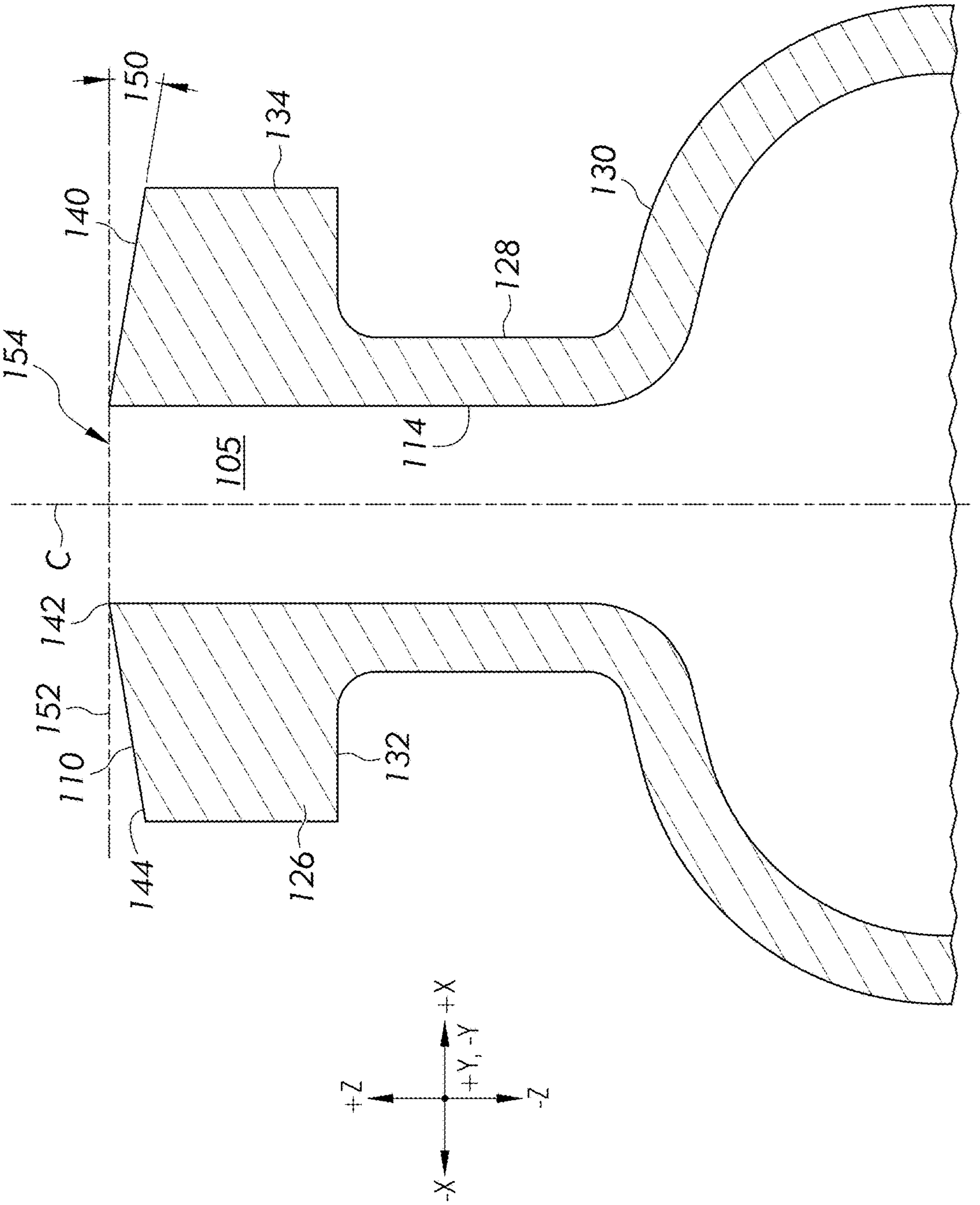
FIG. 2 schematically depicts a cross-sectional view of an upper portion of a glass container of the sealed pharmaceutical container of FIG. 1, according to one or more embodiments described herein.
Figure 3:
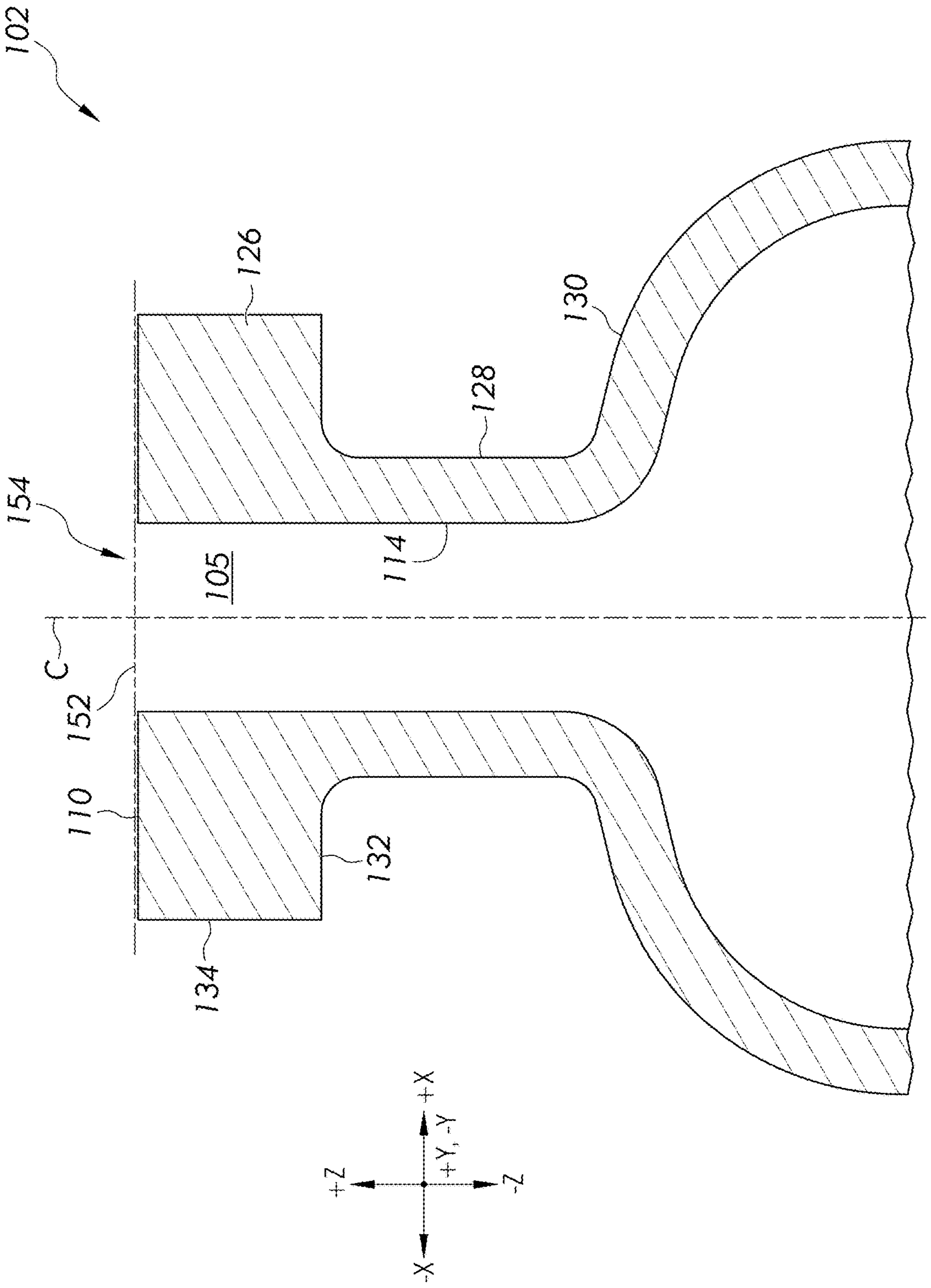
FIG. 3 schematically depicts a cross-sectional view of an upper portion of another glass container, according to one or more embodiments described herein.
Figure 4:
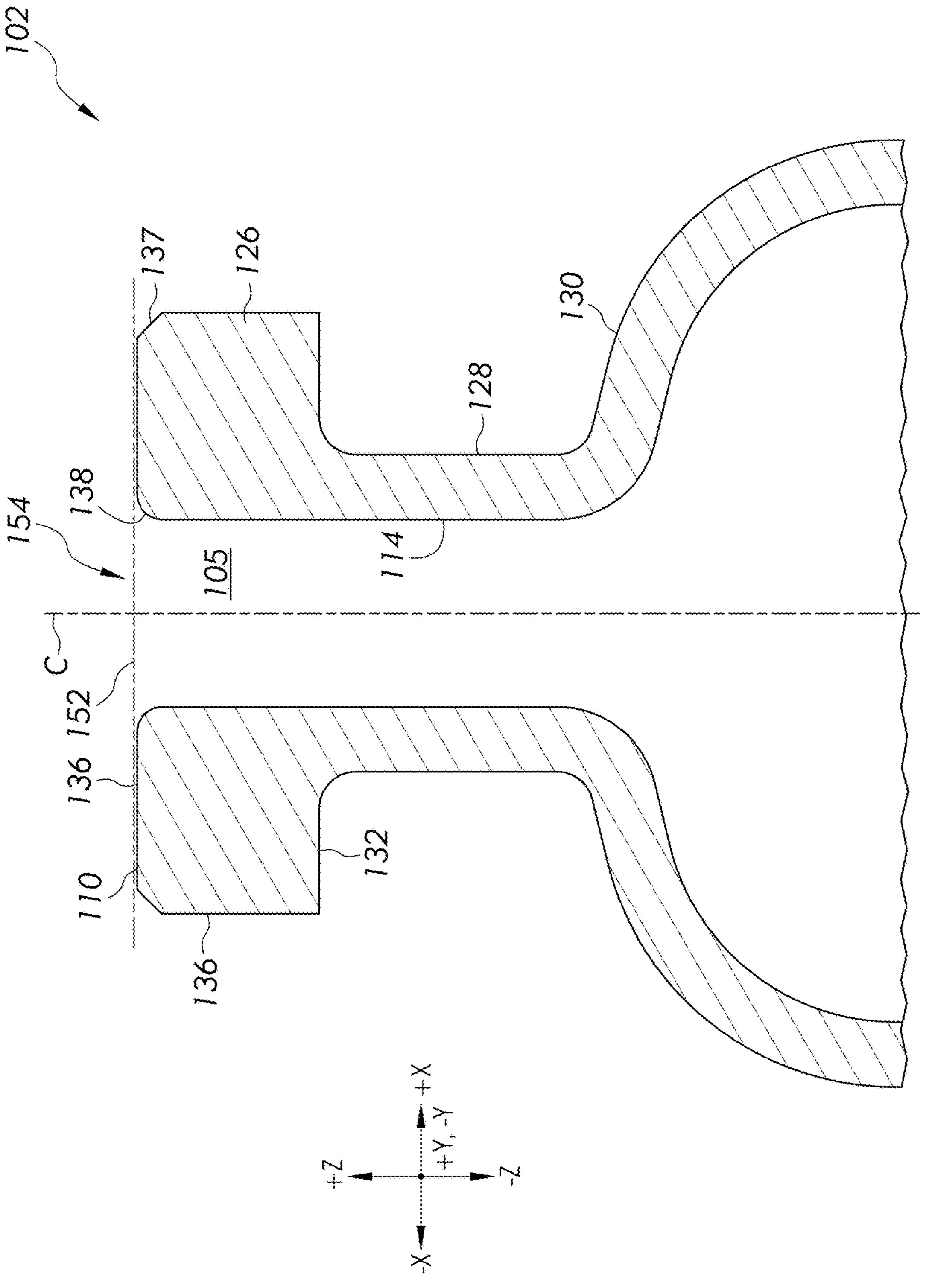
FIG. 4 schematically depicts a cross-sectional view of an upper portion of still another glass container, according to one or more embodiments described herein.

Referring again to FIG. 1, the flange 126 of the glass container 102 can comprise the upper sealing surface 110, an underside surface 132, and an outer surface 134. The outer surface 134 may define an outer diameter of the flange 126. The upper sealing surface 110 is the surface of the flange 126 that contacts the stopper 106 to form a fluid tight seal between the stopper 106 and the flange 126. Referring to FIGS. 2-4, the upper sealing surface 110 of the flange 126 of the glass container 102 may have different configurations. Referring to FIG. 2, in embodiments, the upper sealing surface 110 may comprise an inclined sealing surface 140. The inclined sealing surface 140 may extend at least part way or all the way between the outer surface 134 of the flange 126 and the inner surface 114 of the glass container 102. The inclined sealing surface 140 may extend at an angle 150 relative to a plane 152 extending through an end 154 of the opening 105. The plane 152 may be a planar surface that rests on top of the glass container 102 at the opening 105 (e.g., that rests on peaks of the inclined sealing surface 140). In embodiments, the plane 152 may connect points extending around the upper sealing surface 110 that are most distant from a reference point (e.g., the floor portion 122, see FIG. 1) of the glass container 102. The plane 152 may extend through the top of the glass container 102 in a direction perpendicular to the center axis C of the glass container 102 (e.g., in the X-Y plane of the coordinate axis in FIG. 2). In embodiments, the plane 152 extends perpendicular to the portion of the inner surface 114 defining the opening 105. The angle 150, as described herein, may be referred to as a "flange angle." In embodiments, the angle 150 is greater than 5 degrees and less than or equal to 45 degrees.

Referring now to FIG. 3, in embodiments, the glass container 102 may include an upper sealing surface 110 that extends in the plane 152 extending through the end 154 of the opening 105 in the glass container 102. In embodiments, the upper sealing surface 110 may extend substantially perpendicular (e.g., at an angle greater than or equal to 89.5 degrees and less than or equal to 90.5 degrees) to the center axis C of the glass container 102. In embodiments, the upper sealing surface 110 may extend substantially perpendicular to the inner surface 114 of the glass container 102, the inner surface 114 defining the opening 105. Such an upper sealing surface 110 may increase a contact area between the stopper 106 (see FIG. 1) and the upper sealing surface 110, which may increase the probability of maintaining integrity of the seal.

In the glass container 102 depicted in FIG. 3, the upper sealing surface 110 extends from the outer surface 134 to the inner surface 114. It should be appreciated that the upper sealing surface 110 may include a variety of different features consistent with the present disclosure. Referring now to FIG. 4, in embodiments, the upper sealing surface 110 of the glass container 102 may include flat portion 136, a chamfer 137, a rounded corner 138, or combinations of these. When present, the chamfer 137 may extend between the flat portion 136 and the outer surface 134 of the flange 126. When present, the rounded corner 138 may extend between the flat portion 136 and the inner surface 114. In embodiments, the flat portion 136 may extend in the plane 152, as described in relation to the upper sealing surface 110 in FIG. 3. In other embodiments, the flat portion 136 may be angled relative to plane 152, as described in relation to the upper sealing surface 110 shown in FIG. 2. In embodiments, the chamfer 137 may extends at an angle of 45 degrees relative to the flat portion 136. In embodiments, the chamfer 137 may increase the integrity of the seal created by the stopper 106 by allowing the stopper 106 to encapsulate the upper sealing surface 110 in multiple directions. In embodiments, instead of the rounded corner 138, the upper sealing surface 110 may include an inner chamfer similar extending between the flat portion 136 and the inner surface 114, the second chamfer having features similar to those described for chamfer 137. It should be appreciated that any of the features (e.g., the chamfer 137, the rounded corner 138, or other sealing feature) described herein with respect to FIG. 4 may also be incorporated into the inclined sealing surface 140 described herein with respect to FIG. 2 (e.g., the upper sealing surface 110 that forms an angle 150 with the plane 152 may comprise a chamfer extending between the inclined sealing surface 140 and the outer surface 134, a rounded corner 138 extending between the inclined sealing surface 140 and the inner surface 114, or both the chamfer 137 and the rounded corner 138).

Referring now to FIG. 5, the sealed glass container 100 includes the sealing assembly 104 attachable to the glass container 102 at least in part through engagement with the opening 105 of the glass container 102. The sealing assembly 104 includes the stopper 106 and the cap 108. The stopper 106 may comprise an insertion portion 117 and a sealing portion 119. The insertion portion 117 may be inserted into the opening 105 of the glass container 102 until the sealing portion 119 contacts the upper sealing surface 110 of the glass container 102. The stopper 106 may be made from a resilient material that is able to be compressed by the cap 108 during sealing. In embodiments, the stopper 106 may be constructed of synthetic rubbers or other elastomers. Such materials beneficially have high permeation resistance and elasticity to facilitate insertion of the stopper 106 into the glass container 102 to seal the interior of the glass container 102. Synthetic rubbers may include, but are not limited to butyl rubbers or other synthetic rubbers.

The cap 108 may be a metal-containing cap. Referring again to FIG. 5, the cap 108 may include a cap skirt 160 and a cap cover 170 coupled to the cap skirt 160. The cap skirt 160 may include at least an annular body 162 and a crimp region 164 disposed at one axial end of the annular body 162. The cap skirt 160 may further include an attachment flange 166 coupled to the other axial end of the annular body 162. The annular body 162 of the cap skirt 160 may have an inner surface 168 and an outer surface 169. The inner surface 168 may face radially inward towards the flange 126 of the glass container 102 and may contact portions of the outer surface 134 of the flange 126, portions of the stopper 106, or both when the sealing assembly 104 is installed on the glass container 102. The outer surface 169 of the annular body 162 may face radially outward away from the flange 126 of the glass container 102. A thickness $t_{CS}$ of the annular body 162 of the cap skirt 160 is the distance between two opposing points on the inner surface 168 and the outer surface 169 of the annular body 162.

Referring again to FIG. 5, the attachment flange 166 may be configured to engage with the cap cover 170 to couple the cap cover 170 to the cap skirt 160. In embodiments, the attachment flange 166 may be an annular flange that extends from the annular body 162 radially inward towards axis A of the glass container 102. The attachment flange 166 may be disposed at an end of the annular body 162 opposite the end comprising the crimp region 164.

The crimp region 164 may be disposed at a bottom end of the annular body 162 of the cap skirt 160. The bottom end of the annular body 162 refers to the end of the annular body 162 oriented in the −Z direction of the coordinate axis of FIG. 5. The crimp region 164 may be constructed of a crimpable metal, such as aluminum metal or an alloy of aluminum. Any other crimpable metal may be suitable for constructing the crimp region 164 of the cap skirt 160.

The cap 108 may be placed over the stopper 106 and around the flange 126 of the glass container 102. The cap 108 may be crimped to the flange 126. Crimping the cap 108 to the flange 126 includes deforming the crimp region 164 of the cap skirt 160 around the underside surface 132 of the flange 126 so that the cap 108 compresses the stopper 106, which presses the sealing portion 119 of the stopper 106 against the upper sealing surface 110 of the flange 126 to form a seal between the upper sealing surface 110 of the flange 126 and the sealing portion 119 of the stopper 106. In embodiments, the cap 108 of the sealing assembly 104 is crimped around the flange 126 of the glass container 102 via any suitable crimping method (e.g., a pneumatic crimping apparatus or the like). During the sealing process, the stopper 106 is inserted into the opening 105 in the glass container 102, and a compression force is applied to the cap 108 during crimping. For example, as depicted in FIG. 5, the cap 108 comprises the crimp region 164 that contacts the underside surface 132 of the flange 126 to force the stopper 106 to remain in a compressed state and form a seal after the crimping process. Compression of the stopper 106 generates a residual sealing force within the flange 126 that maintains compression on the stopper 106 after the cap 108 is crimped into place. In embodiments, the crimp region 164 of the cap 108 that directly contacts the underside surface 132 of the flange 126 possesses a length 111 that is greater than or equal to 1 mm to facilitate maintenance of residual sealing force within the stopper 106 at storage temperatures of less than or equal to −80° C.

Cooling of existing sealed containers to cryogenic storage temperatures less than or equal to −80° C., for example, may cause loss of seal integrity between the stopper and the glass container. Without being bound by any particular theory, it is believed that loss of seal integrity at temperatures less than or equal to −80° C. may be caused by differences in thermal shrinkage between various components, loss of resiliency of the stopper at temperatures less than the glass transition temperature of the material from which the stopper is made, or a combination of these.

When the sealed glass container 100 is cooled to relatively low storage temperatures of less than or equal to −80° C. (e.g., less than or equal to −100° C., less than or equal to −125° C., less than or equal to −150° C., less than or equal to −175° C., or even less than or equal to −180° C.), each of the constituent components of the sealed glass container 100 may undergo a volumetric shrinkage that is dependent on the thermal properties of that component. As depicted in FIG. 5, the volume of material disposed between the crimp region 164 of the cap skirt 160 and the attachment flange 166 or top cover 170 of the cap 108 comprises the sealing portion 119 of the stopper 106 and the flange 126 of the glass container 102. If the combination of the stopper 106 and the flange 126 shrinks in an amount that is greater than the amount of shrinkage of the cap 108, the compression on the stopper 106 provided by the cap 108 may diminish, which increases the probability of the seal at the upper sealing surface 110 being broken.

Referring again to FIG. 5, the combined height 154 (e.g., in the +/−Z direction of the coordinate axis of FIG. 5) of the flange 126 (flange height 156) and compressed stopper 106 (stopper height 158 when the stopper 106 is compressed by the cap 108) is approximately equal to the axial length of the annular body 162 (e.g., the distance between the crimp region 164 and the attachment flange 166 of the cap skirt 160 of the cap 108). When crimped, the cap 108 may compress the stopper 106 against the upper sealing surface 110 to form a seal. If the combined height 154 shrinks to a greater extent than the annular body 162 of the cap skirt 160, however, the compression of the stopper 106 may diminish, reducing the residual sealing force. To maintain a compression of the stopper 106, the shrinkage ΔL of the annular body 162 of the cap 108, the sealing portion 119 of the stopper 106, and the flange 126 of the glass container 102 may satisfy the relation in Equation (1).

$$\Delta L_{cap} \geq \Delta L_{flange} + \Delta L_{stopper} \tag{1}$$

In Equation 1, the shrinkage ΔL of each component may be approximated by the relationship in Equation (2).

$$\Delta L = L_i \times (e^{\int \alpha(T)} - 1), \tag{2}$$

In Equation (2), $L_i$ is an initial dimension of the component and α(T) is the temperature-dependent CTE of the material out of which each of the cap 108, the stopper 106, and the glass container 102 are constructed.

Further compounding the problem, the stopper 106 may lose elasticity at temperatures less than or equal to −80° C. The stopper 106 may be constructed of a polymer-based material (e.g., butyl or other synthetic rubbers). Each of these materials may have glass a transition temperature ($T_g$). Below the $T_g$, the material of the stopper 106 may behave as a solid (e.g., loss of elasticity), resulting in a diminished sealing force at the upper sealing surface 110 of the flange 126. For example, if the stopper 106 is cooled to a temperature less than or equal to its $T_g$, the stopper 106 may not fill the entirety of the gap between the upper sealing surface 110 and the attachment flange 166 or top cover 170 of the cap 108, thereby increasing the probability of the seal breaking. That is, the stopper 106 effectively behaves as two different materials as it is cooled below its glass transition temperature: an elastic material above the transition temperature, and a solid glass below the transition temperature. Using Equation (2) above, the shrinkage of the stopper 106 disposed between the flange 126 and the attachment flange 166 or top cover 170 of the cap 108, when cooled from an initial temperature $T_i$ greater than $T_g$ to a final temperature $T_F$ less than $T_g$, may be approximated according to Equation 3.

$$\Delta L_{stopper} = L_{i,stopper} \times \left(e^{\int_{T_i}^{T_g} \alpha_{rubber}(T)dT + \int_{T_g}^{T_F} \alpha_{glass}(T)dT} - 1\right) \tag{3}$$

In Equation 3, $\alpha_{glass}$ refers to the CTE of the glass-like material that the rubber of the stopper 106 transforms into below its glass transition temperature $T_g$.

In embodiments, to maintain the seal, the cap 108 and stopper 106 may be constructed such that the shrinkage of the cap 108 is greater than or equal to the combined shrinkage of the stopper 106 and the flange 126 of the glass container 102. Typical commercially available sealing assemblies for glass containers generally include metal crimp cap that consists entirely of aluminum metal. The aluminum crimp cap encompasses the rubber stopper and the flange of the glass container. Typical aluminum crimp caps that consist entirely of aluminum metal do not have a coefficient of thermal expansion (CTE) that is great enough to maintain the sealing force of the stopper against the upper sealing surface of the flange of the glass container when cooled to temperatures less than or equal to −80° C. (e.g., less than or equal to −100° C., less than or equal to −125° C., less than or equal to −150° C., less than or equal to −175° C., or even less than or equal to −180° C.). Typical crimp caps consisting entirely of aluminium metal may have a CTE of approximately $255\times10^{-7}$ $K^{-1}$ at 20° C. Typical rubbers out of which the stopper 106 is constructed (e.g., Butyl 325, Butyl 035, etc.) may have CTEs of greater than or equal to $300\times10^{-7}$ $K^{-1}$. That is, purely in terms of CTE differential, the crimp caps consisting entirely of aluminum metal have a tendency to shrink less than the stopper, resulting in a diminished sealing force at lower storage temperatures of less than or equal to −80° C. Further, the Young's modulus (the resistance to deformation) of existing aluminum crimp caps is not high enough to maintain the sealing force of the stopper against the upper sealing surface of the flange of the glass container.

The present application is directed to designs for the cap 108 of the sealing assembly 104 that increase shrinkage of the cap 108 relative to the stopper 106 and flange 126 of the glass container 102, increase the stiffness of the cap 108, or both in order to maintain container closure integrity (CCI) at temperatures less than or equal to −80° C., less than or equal to −100° C., less than or equal to −125° C., less than or equal to −150° C., less than or equal to −175° C., or even less than or equal to −180° C. In embodiments, the relationship between CTE and stiffness of the cap 108 may be defined to ensure container closure integrity (CCI) at temperatures from −80° C. to −180° C., and even less than or equal to −180° C. To facilitate meeting such a relationship, the shrinkage of the cap 108 may be increased, the stiffness of the cap 108 may be increased, or both. In embodiments, the cap 108, in particular the cap skirt 160 of the cap 108, may have a CTE that is at least $100\times10^{-7}$ $K^{-1}$ greater than the CTE of existing caps or cap skirts consisting of aluminum metal, which has a CTE of approximately $255\times10^{-7}$ $K^{-1}$ at 20° C. In embodiments, the cap 108, in particular the cap skirt 160 of the cap 108, may have a CTE that is at least $100\times10^{-7}$ $K^{-1}$ greater than the CTE of existing caps or cap skirts consisting of aluminum metal at temperatures less than or equal to the glass transition temperature $T_g$ of the stopper 106 (e.g., less than or equal to −45° C.). In embodiments, the cap 108 or cap skirt 160 of the cap 108 of the present disclosure may have a stiffness that is at least 2 times the stiffness of existing aluminum crimp caps consisting of aluminum metal and having a radial thickness of 0.19 mm and an identical axial length, such as a stiffness of greater than or equal to 140 GPa. In embodiments, the cap 108 or cap skirt 160 of the cap 108 may have a CTE greater than a CTE of a metal consisting of aluminum and a stiffness greater than the stiffness of existing aluminum crimp caps consisting of aluminum metal and having a radial thickness of 0.19 mm and an identical axial length.

The cap 108 structures disclosed herein can maintain continuous compression of the stopper 106 against the upper sealing surface 110 of the flange 126 of the glass container 102 as the sealed pharmaceutical container 100 is cooled. Maintaining continuous compression of the stopper 106 against the flange 126 during cooling may maintain container closure integrity (CCI) during cooling to temperatures less than or equal to −80° C., less than or equal to −100° C., less than or equal to −125° C., less than or equal to −150° C., less than or equal to −175° C., or even less than or equal to −180° C. As previously discussed, CCI can be evaluated by conducting a helium leak test as described in USP <1207> (2016). The sealed glass container 100 comprising the caps 108 disclosed herein can maintain the helium leakage rate at is less than or equal to $1.4\times10^{-6}$ $cm^3/s$ as it the sealed glass container 100 is cooled to the temperature at a rate of less than or equal to 5° C. per minute.

The sealing assembly 104 comprising the caps 108 disclosed herein can maintain a helium leakage rate of the sealed glass container 100 of less than or equal to $1.4\times10^{-6}$ $cm^3/s$ as the sealed pharmaceutical container is cooled to a temperature of less than or equal to −45° C. The sealing assembly 104 comprising the caps 108 disclosed herein can maintain a helium leakage rate of the sealed glass container 100 of less than or equal to $1.4\times10^{-6}$ $cm^3/s$ as the sealed pharmaceutical container is cooled to a temperature of less than or equal to −80° C. The sealing assembly 104 comprising the caps 108 disclosed herein can maintain a helium leakage rate of the sealed glass container 100 of less than or equal to $1.4\times10^{-6}$ $cm^3/s$ as the sealed pharmaceutical container is cooled to a temperature of less than or equal to −100° C., less than or equal to −120° C., less than or equal to −150° C., or even less than or equal to −180° C.

Referring again to FIG. 5, as previously discussed, the cap 108 comprises the cap skirt 160 and the top cover 170. The cap skirt 160 includes the annular body 162, the crimp region 164 at the bottom end of the annular body 162 (e.g., the end of the annular body 162 in the −Z direction of the coordinate axis in FIG. 5), and the attachment flange 166 at the top end of the annular body 162 opposite from the crimp region 164. The top cover 170 may be shaped like a solid disc or an annular disc and may be constructed of a polymeric material. In embodiments, the top cover 170 may be an annular disc having an axial opening (not shown) extending axially (e.g., in the +/−Z direction of the figures) through the top cover 170. The axial opening may provide access to the stopper 106 through the cap 108 so that a syringe can be utilized to penetrate through the stopper 106 to remove the contents of the sealed glass container 100 without removing the cap 108 and stopper 106 from the glass container 102. The top cover 170 may be coupled to the attachment flange 166 of the cap skirt 160.

The crimp region 164 may comprise a crimpable metal. Crimpable metals are metals that are able to be crimped using commercially available crimping devices. In embodiments, the crimpable metal of the crimp region 164 may comprise aluminum or an aluminum alloy.

In embodiments, the cap skirt 160 may have a CTE greater than a CTE of a metal consisting of aluminium. In embodiments, the annular body 162 of the cap skirt 160 may have a CTE greater than a CTE of a metal consisting of aluminium. The greater CTE of the annular body 162 of the cap skirt 160 may increase the shrinkage of the cap skirt 160 when the sealed glass container 100 is cooled, which may enable the cap 108 to exert greater sealing force on the stopper 106 as the sealed glass container 100 is cooled to temperatures less than or equal to −80° C., less than or equal to −100° C., less than or equal to −125° C., less than or equal to −150° C., less than or equal to −175° C., or even less than or equal to −180° C.

Figure 6A:
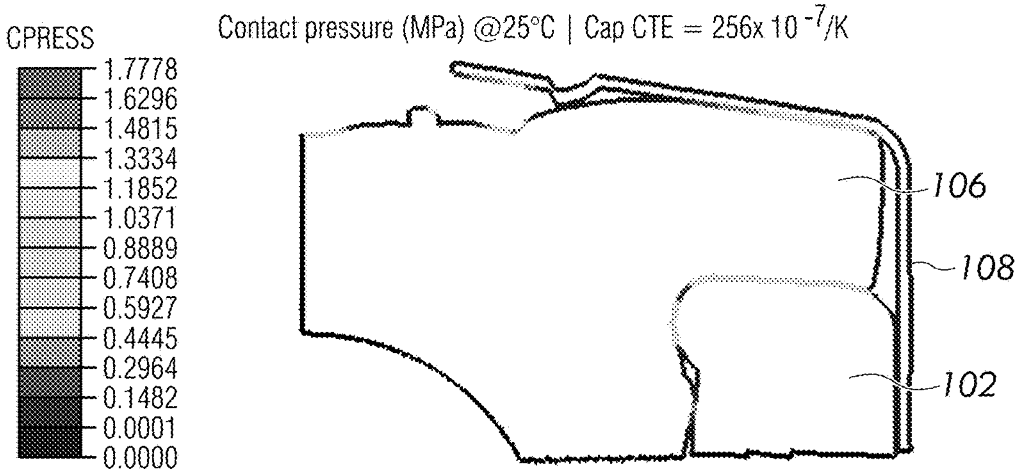
FIG. 6A depicts a simulation of compression of a stopper against a flange of a glass container by a cap at a storage temperature of 25° C., where the cap has a CTE of $256\times10^{-7}$/° C., according to one or more embodiments described herein.
Figure 6B:
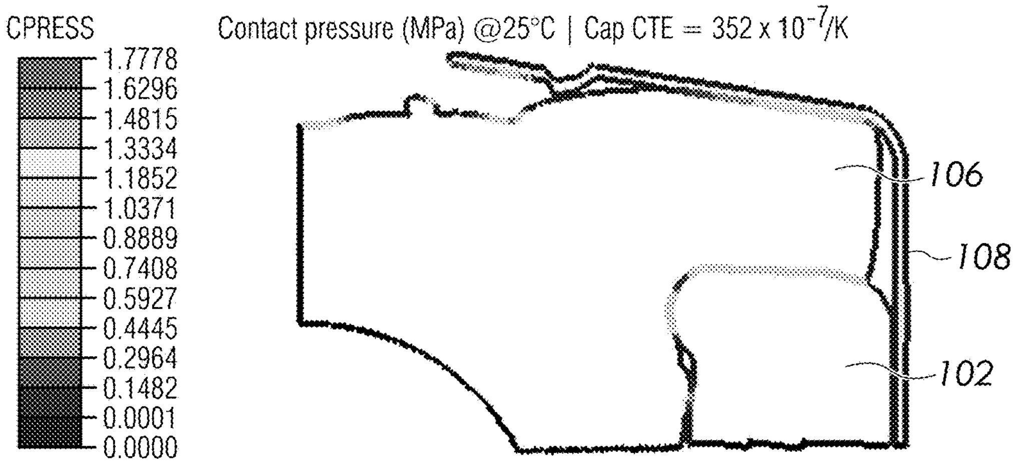
FIG. 6B depicts a simulation of compression of a stopper against a flange of a glass container by a cap at a storage temperature of 25° C., where the cap has a CTE of $352\times10^{-7}$/° C., according to one or more embodiments described herein.
Figure 6C:
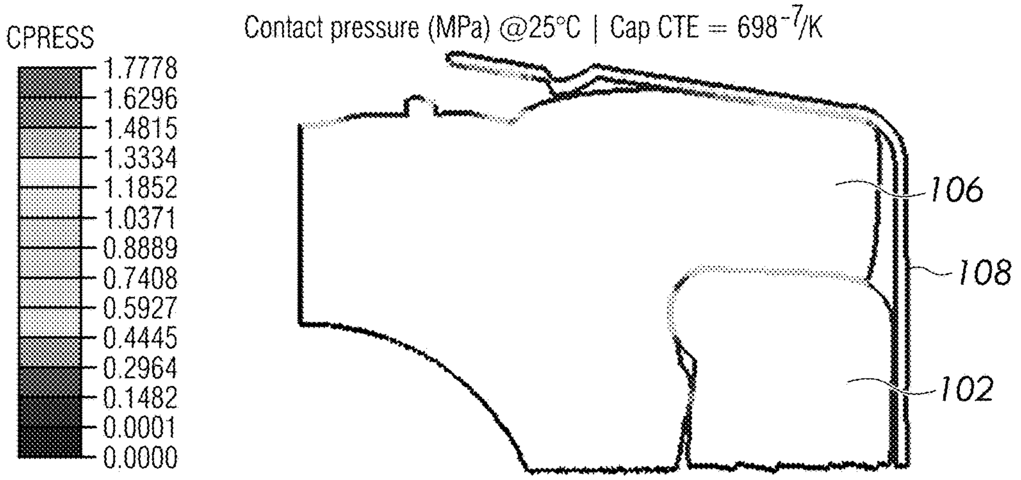
FIG. 6C depicts a simulation of compression of a stopper against a flange of a glass container by a cap at a storage temperature of 25° C., where the cap has a CTE of $698\times10^{-7}$/° C., according to one or more embodiments described herein.

Referring now to FIGS. 6A, 6B, and 6C, the seal pressure between the stopper 106 and the upper sealing surface 110 of the flange 126 of the glass container 102 at different CTE values of the cap skirt 160 and at different temperatures is simulated. The seal pressure at 25° C. is simulated for cap skirts 162 having a CTE of $256\times10^{-7}$ $K^{-1}$ (FIG. 6A), a CTE of $352\times10^{-7}$ $K^{-1}$ (FIG. 6B), and a CTE of $698\times10^{-7}$ $K^{-1}$. As shown in FIGS. 6A-6C, each of the simulations show substantial seal pressure along the entire interface between the stopper 106 and the upper sealing surface 110 at 25° C. At 25° C., there is very little difference in the seal pressure as a function of CTE of the cap skirt 162.

Figure 7A:
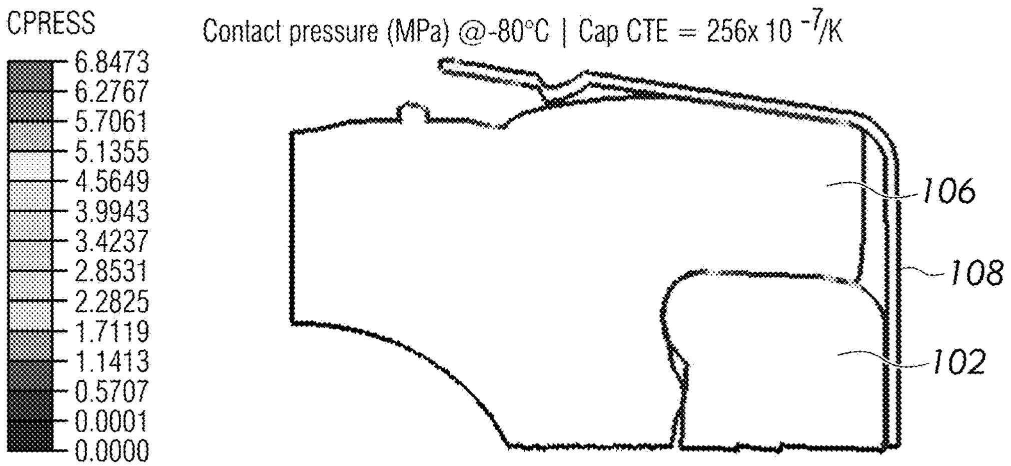
FIG. 7A depicts a simulation of compression of a stopper against a flange of a glass container by a cap at a storage temperature of −80° C., where the cap has a CTE of $256\times10^{-7}$/° C., according to one or more embodiments described herein.
Figure 7B:
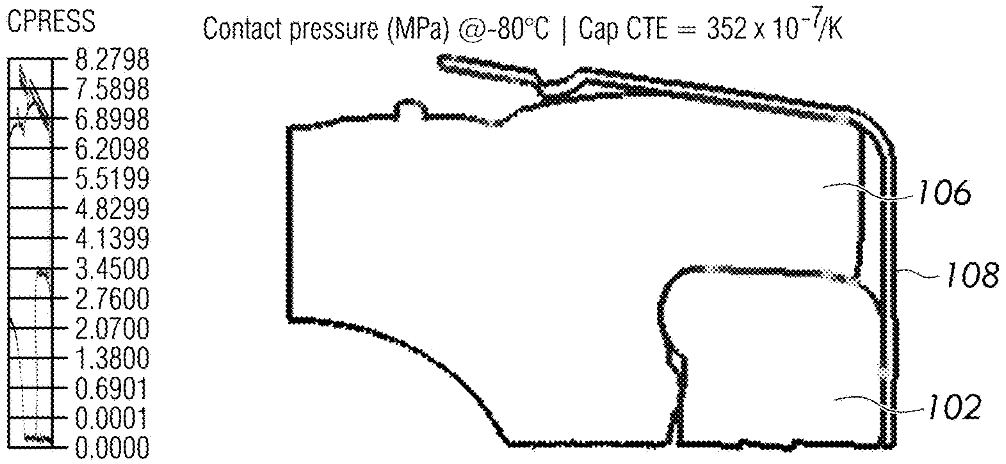
FIG. 7B depicts a simulation of compression of a stopper against a flange of a glass container by a cap at a storage temperature of −80° C., where the cap has a CTE of $352\times10^{-7}$/° C., according to one or more embodiments described herein.
Figure 7C:
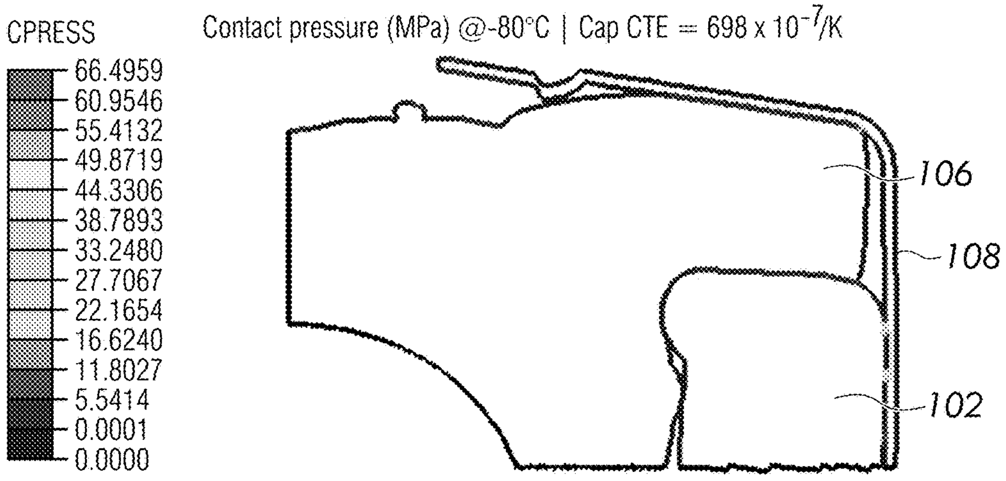
FIG. 7C depicts a simulation of compression of a stopper against a flange of a glass container by a cap at a storage temperature of −80° C., where the cap has a CTE of $698\times10^{-7}$/° C., according to one or more embodiments described herein.
Figure 8A:
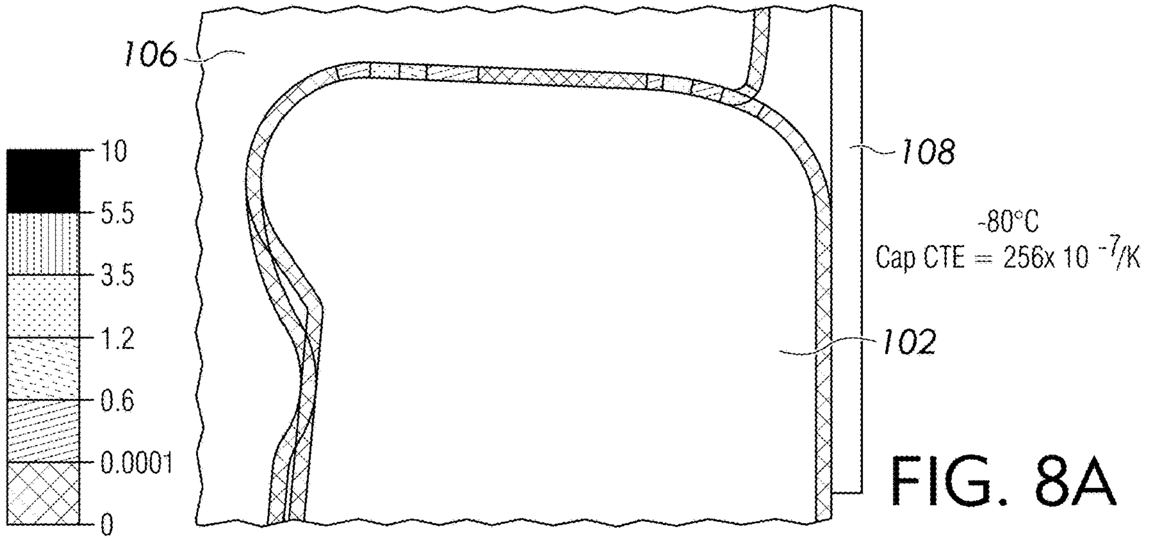
FIG. 8A graphically depicts an interface between the stopper and the flange of the glass container in the simulation of FIG. 7A, where the differences in seal pressure are annotated using differences in shading patterns, according to one or more embodiments described herein.
Figure 8B:
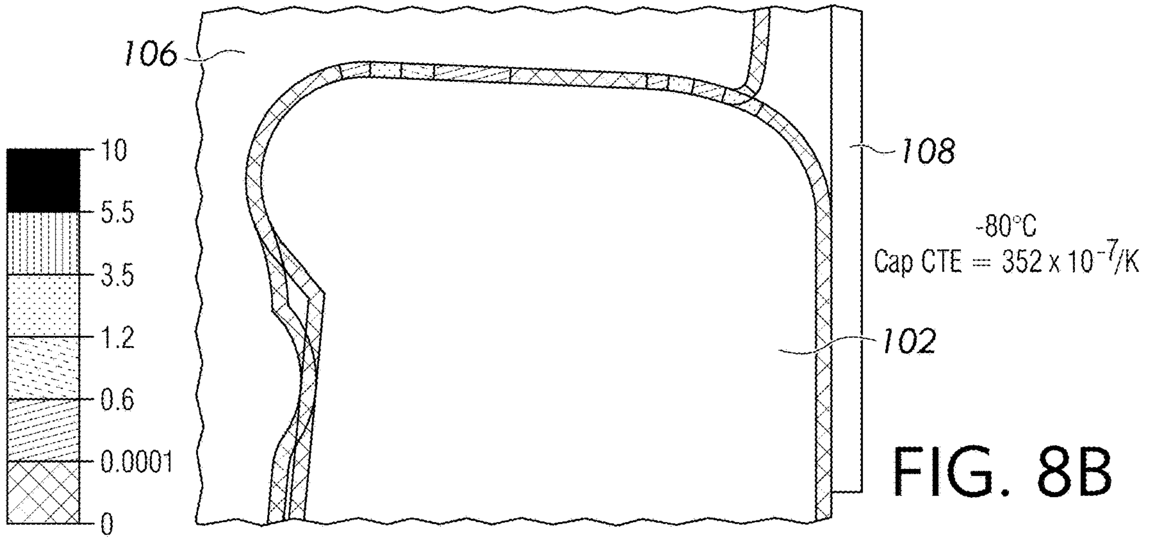
FIG. 8B graphically depicts an interface between the stopper and the flange of the glass container in the simulation of FIG. 7B, where the differences in seal pressure are annotated using differences in shading patterns, according to one or more embodiments described herein.
Figure 8C:
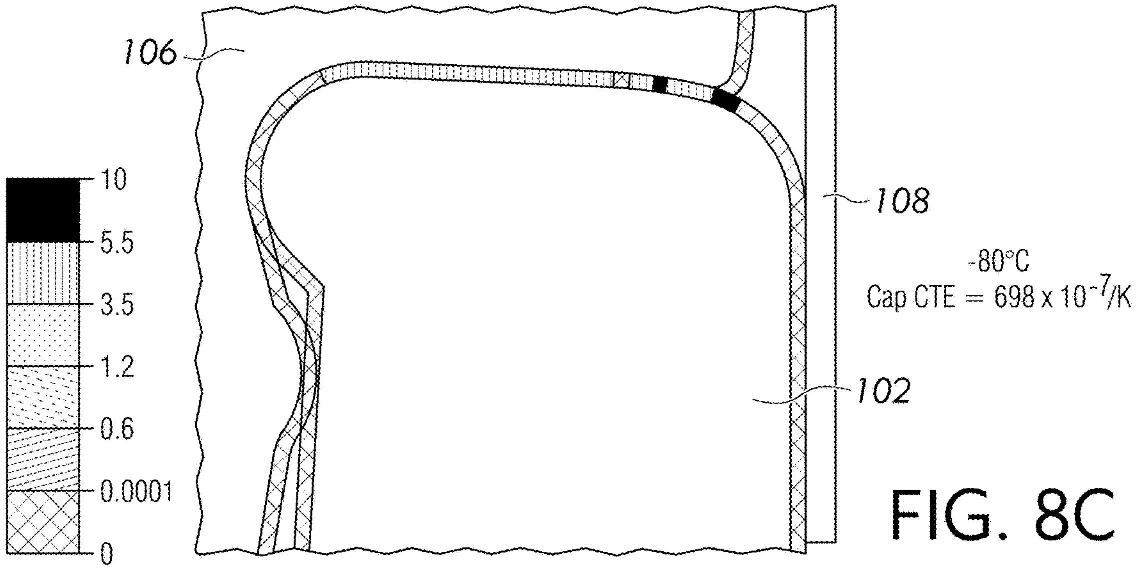
FIG. 8C graphically depicts an interface between the stopper and the flange of the glass container in the simulation of FIG. 7C, where the differences in seal pressure are annotated using differences in shading patterns, according to one or more embodiments described herein.

Referring now to FIGS. 7A, 7B, and 7C, the simulations are repeated for each of the cap skirts 162 at a temperature of −80° C. Referring to FIGS. 8A, 8B, and 8C, close-ups of the interface between the stopper 106 and the flange 126 of the glass container 102 are graphically depicted and the different seal pressure regions illustrated with different shade patterns to better show the difference in seal pressures and contact areas. As shown in FIG. 8A, for the cap skirt 162 having a CTE of $256\times10^{-7}$ $K^{-1}$, the seal pressure is shown to be greatly reduced and the regions of no seal pressure (e.g., less than 0.0001) are increased compared to the simulation at 25° C. in FIG. 6A. FIG. 8A shows a large portion of the interface between the stopper 106 and the upper sealing surface 110 having zero seal pressure. Referring to FIG. 8B, when the CTE of the cap skirt 162 is increased to $352\times10^{-7}$ $K^{-1}$, a greater portion of the interface between the stopper 106 and the upper sealing surface 110 has a positive seal pressure and the seal pressure in these regions is greater at −80° C. compared to the seal pressure profile achieved with the cap skirt 162 having CTE of $256\times10^{-7}$ $K^{-1}$ of FIG. 8A. Referring now to FIG. 8C, when the CTE of the cap skirt 162 is increased to $698\times10^{-7}$ $K^{-1}$, the seal pressure extends across a much greater percentage of the width of the upper sealing surface 110 compared to the lower CTE simulations in FIGS. 8A and 8B at the temperature of −80° C. Further, with CTE of $698\times10^{-7}$ $K^{-1}$, the contract pressure is greater in magnitude compared to the lower CTE simulations of FIGS. 8A and 8B at the temperature of −80° C.

Figure 9A:
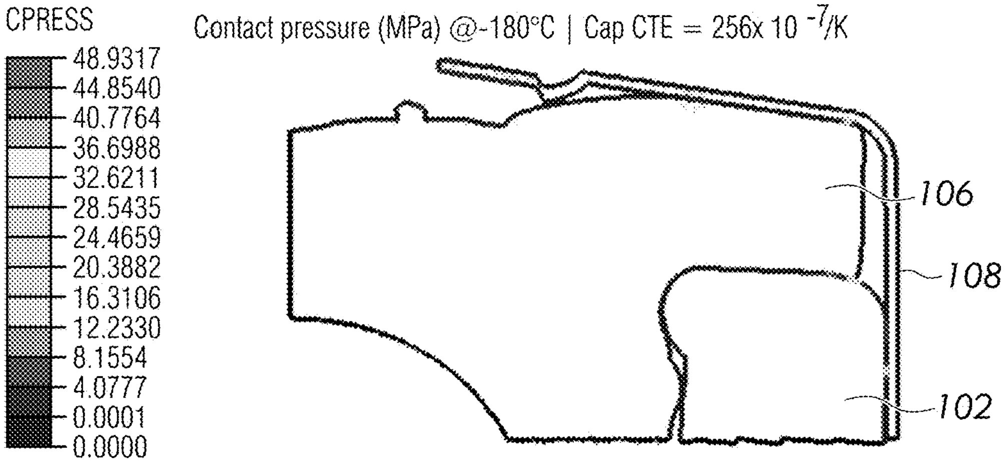
FIG. 9A depicts a simulation of compression of a stopper against a flange of a glass container by a cap at a storage temperature of −180° C., where the cap has a CTE of $256\times10^{-7}$/° C., according to one or more embodiments described herein.
Figure 9B:
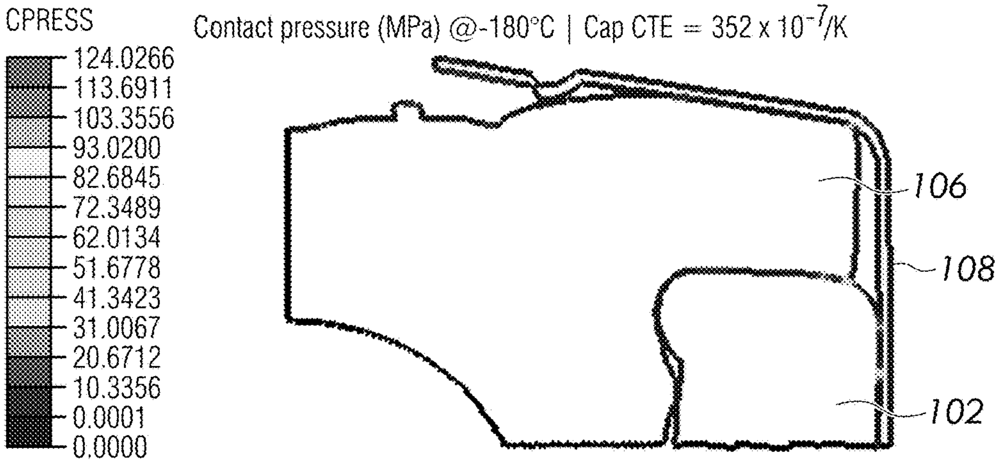
FIG. 9B depicts a simulation of compression of a stopper against a flange of a glass container by a cap at a storage temperature of −180° C., where the cap has a CTE of $352\times10^{-7}$/° C., according to one or more embodiments described herein.
Figure 9C:
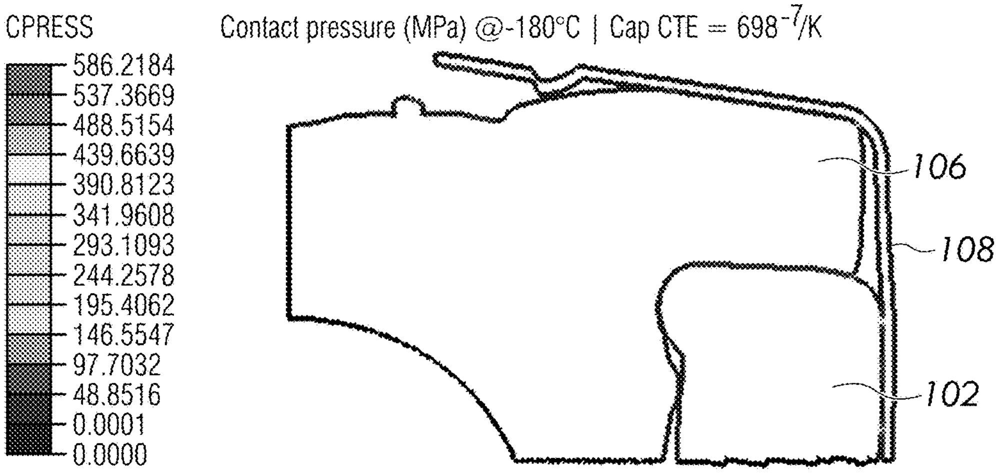
FIG. 9C depicts a simulation of compression of a stopper against a flange of a glass container by a cap at a storage temperature of −180° C., where the cap has a CTE of $698\times10^{-7}$/° C., according to one or more embodiments described herein.
Figure 10A:
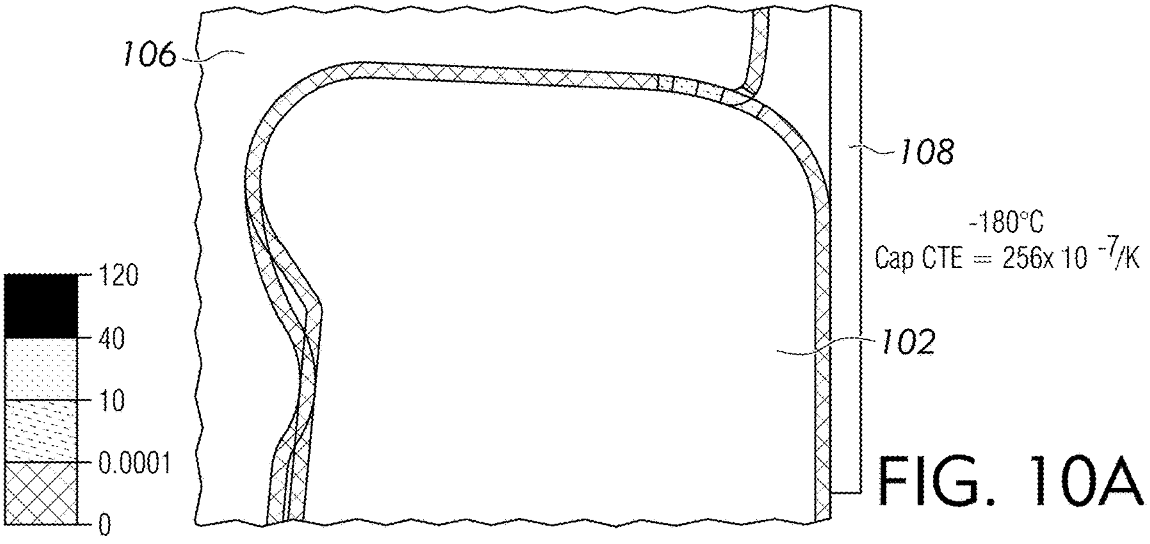
FIG. 10A graphically depicts an interface between the stopper and the flange of the glass container in the simulation of FIG. 9A, where the differences in seal pressure are annotated using differences in shading patterns, according to one or more embodiments described herein.
Figure 10B:
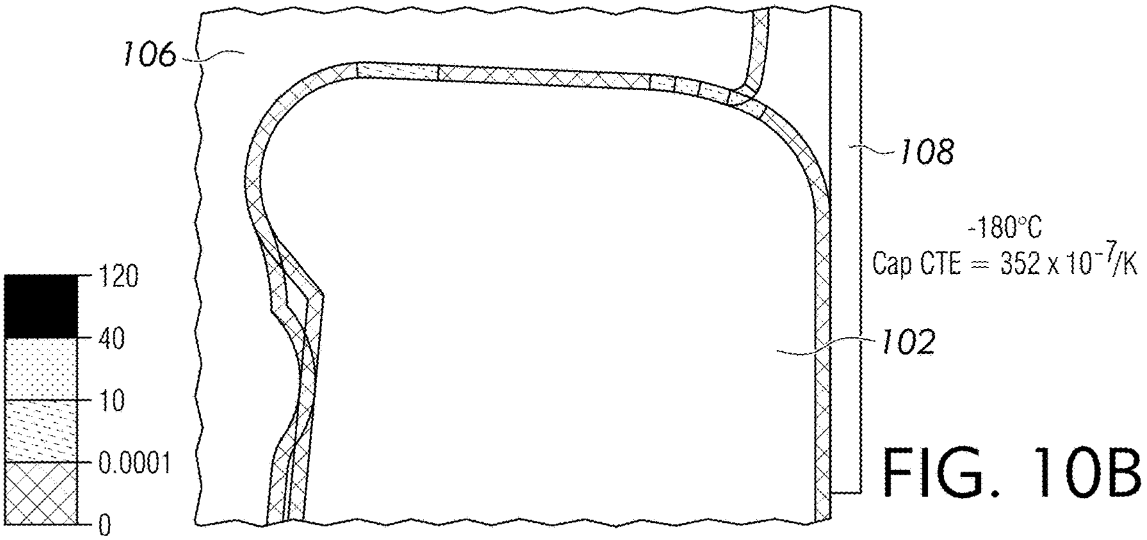
FIG. 10B graphically depicts an interface between the stopper and the flange of the glass container in the simulation of FIG. 9B, where the differences in seal pressure are annotated using differences in shading patterns, according to one or more embodiments described herein.
Figure 10C:
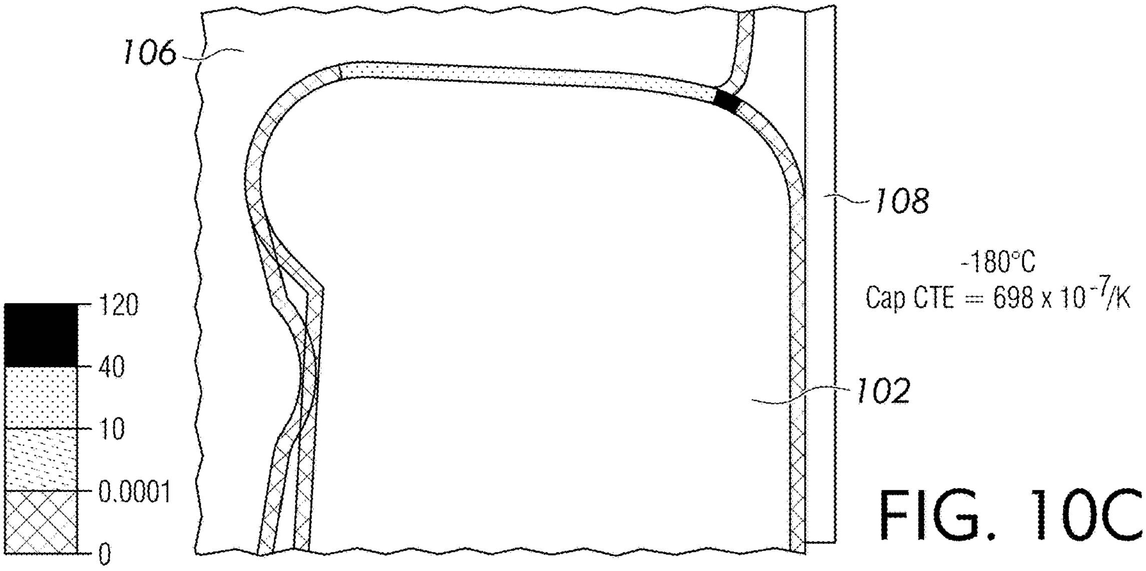
FIG. 10C graphically depicts an interface between the stopper and the flange of the glass container in the simulation of FIG. 9C, where the differences in seal pressure are annotated using differences in shading patterns, according to one or more embodiments described herein.

Referring now to FIGS. 9A, 9B, and 9C, the simulations are repeated for each of the cap skirts 162 at a temperature of −180° C. Referring to FIGS. 10A, 10B, and 10C, close-ups of the interface between the stopper 106 and the flange 126 of the glass container 102 are graphically depicted and the different seal pressure regions illustrated with different shade patterns to better show the difference in seal pressures and contact areas. As shown in FIG. 10A, for the cap skirt 162 having a CTE of $256\times10^{-7}$ $K^{-1}$, the regions of no seal pressure (e.g., less than 0.0001) are increased compared to the simulation at −80° C. in FIG. 8A. FIG. 10A shows seal pressure only at the outer edge of the upper sealing surface 110, which greatly increases the probability of losing container closure integrity during cooling. Referring to FIG. 10B, when the CTE of the cap skirt 162 is increased to $352\times10^{-7}$ $K^{-1}$, a greater portion of the interface between the stopper 106 and the upper sealing surface 110 has a positive seal pressure and the seal pressure in these regions is greater at −180° C. compared to the seal pressure profile achieved with the cap skirt 162 having CTE of $256\times10^{-7}$ $K^{-1}$ of FIG. 10A. The two regions of seal pressure shown in FIG. 10B can greatly reduce the probability of CCI failure at −180° C. compared to the single point of seal pressure shown in FIG. 10A. Referring now to FIG. 10C, when the CTE of the cap skirt 162 is increased to $698\times10^{-7}$ $K^{-1}$, the seal pressure extends across a much greater percentage of the width of the upper sealing surface 110 compared to the lower CTE simulations in FIGS. 10A and 10B at the temperature of −180° C. Further, with CTE of $698\times10^{-7}$ $K^{-1}$, the seal pressure is greater in magnitude compared to the lower CTE simulations of FIGS. 10A and 10B at the temperature of −180° C.

Figure 11:
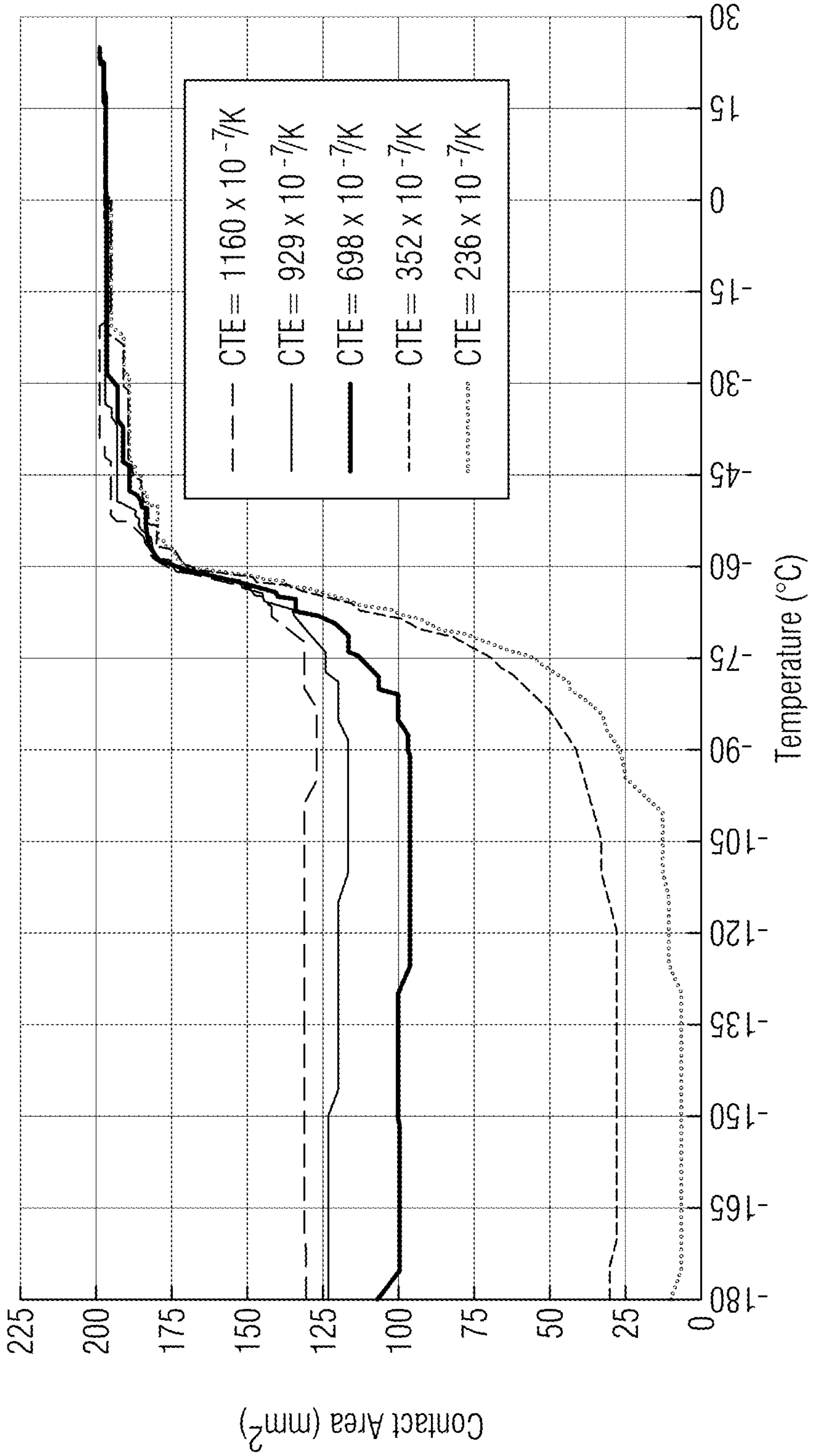
FIG. 11 graphically depicts a plot of contact area (y-axis) between the flange and the stopper as a function of temperature (x-axis) for a plurality of sealed glass containers cooled at a constant cooling rate, where the sealing assemblies of the glass containers have caps with different CTEs when cooled at a first cooling rate, according to one or more embodiments described herein.

Referring now to FIG. 11, the contact area (y-axis) between the stopper 106 and the upper sealing surface 110 as a function of temperature (x-axis) is graphically depicted for cap skirts 162 having different CTE ranging from $236\times10^{-7}$ $K^{-1}$ to $1160\times10^{-7}$ $K^{-1}$. As shown in FIG. 11, at a CTE of $236\times10^{-7}$ $K^{-1}$, the contact area between the stopper 106 and the upper sealing surface 100 is less than 25 $mm^2$ at temperatures less than −90° C. As the CTE of the cap skirt 162 is increased, the contact area between the stopper 106 and the upper sealing surface 100 increases. Increasing the CTE of the cap skirt 162 to just $352\times10^{-7}$ $K^{-1}$ more than doubles the contact area between the stopper 106 and upper sealing surface 100 compared to the contact area with the CTE of $236\times10^{-7}$ $K^{-1}$. The contact area continues to increase as the CTE of the cap skirt 162 is increased. These simulations demonstrate that increasing the CTE of the cap skirt 162 can increase the seal pressure and contact area between the stopper 106 and the upper sealing surface 110 of the flange 126 at decreasing temperatures down to at least −180° C. This increase in seal pressure and contact area resulting in increasing the CTE of the cap skirt 162 can reduce the probability of CCI failure at temperatures less than −80° C.

Referring again to FIG. 5, in embodiments, the cap skirt 160, in particular, the annular body 162 of the cap skirt 160, may have a CTE that is greater than the CTE of existing metal crimp caps. The cap skirt 160, in particular the annular body of the cap skirt 160, may comprise a material having a CTE that is greater than the CTE of a typical crimp cap consisting of aluminum. In embodiments, the cap skirt 160, in particular the annular body 162, may comprise a material having a CTE that is greater than the CTE of a metal consisting of aluminum metal (e.g., at least 99% aluminum) by a difference of at least $100\times10^{-7}$ $K^{-1}$. In embodiments, the cap skirt 160, in particular the annular body 162 of the cap skirt 160, may comprise a material having a CTE that is greater than a CTE of the stopper 106. In embodiments, the cap skirt 160, in particular the annular body 162 of the cap skirt 160, may comprise a material having a CTE such that an absolute value of the difference between the CTE of the cap skirt 160 or annular body 162 and the CTE of the stopper is less than or equal to $50\times10^{-7}$ $K^{-1}$. Typical stoppers 106 can have CTE at 20° C. of from $1311\times10^{-7}$ $K^{-1}$ to $3134\times10^{-7}$ $K^{-1}$. In embodiments, the cap skirt 160, in particular the annular body 162 of the cap skirt 160, may comprise a material having a CTE that satisfies the following Equation 4, in which $\alpha_{skirt}$ is the CTE of the cap skirt 160 at the glass transition temperature of the stopper 106, $\alpha_{stopper}$ is the CTE of the stopper 106 at the glass transition temperature of the stopper 106, $\alpha_{flange}$ is the CTE of the flange 126 of the glass container 102 at the glass transition temperature of the stopper 106, $h_{stopper}$ is the height of the stopper 106 encompassed by the cap skirt 160, and $h_{flange}$ is the height of the flange 126.

$$\alpha_{skirt} \geq \left[\frac{(\alpha_{stopper} \times h_{stopper} + \alpha_{flange} \times h_{flange})}{(h_{stopper} + h_{flange})}\right] \tag{4}$$

In embodiments, the cap skirt 162 or the annular body 162 of the cap skirt 160 may comprise a material having a CTE that is greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, or even greater than or equal to $500\times10^{-7}$ $K^{-1}$. In embodiments, the cap skirt 162 or the annular body 162 of the cap skirt 160 may comprise a material having a CTE that is greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, or even greater than or equal to $500\times10^{-7}$ $K^{-1}$ at temperatures less than or equal to the glass transition temperature of the stopper 106 (e.g., less than or equal to −45° C.).

In embodiments, the greater CTE of the annular body 162 of the cap skirt 160 may be achieved by constructing the cap skirt 160, or portions thereof, from a material having a CTE greater than aluminum metal (e.g., greater than $255\times10^{-7}$ $K^{-1}$ at 20° C.). The material of the cap skirt 160, in particular the annular body 162, may comprise a material selected from a metal, a metal alloy, or a polymer-metal composite, where the material has a high CTE of greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, or even greater than or equal to $500\times10^{-7}$ $K^{-1}$.

In embodiments, the cap skirt 160 or the annular body 162 of the cap skirt 160 may comprise a metal or metal alloy having a CTE greater than the CTE of aluminum metal (i.e., a metal consisting of aluminium), such as a CTE greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, or even greater than or equal to $500\times10^{-7}$ $K^{-1}$. In embodiments, the metal or metal alloy may have a CTE greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, or even greater than or equal to $500\times10^{-7}$ $K^{-1}$ at temperatures less than or equal to the glass transition temperature $T_g$ of the stopper 106 (e.g., less than or equal to about −45° C.). In embodiments, the cap skirt 160 can be made of a high CTE metal that can be crimped. Examples of high CTE metals that can be crimped include, but are not limited to, Li, Li-containing alloys, Pb, Sb—Pb alloys, Zn, Zn-containing alloys, Zn—Pb—Cd alloys, Cd, or combinations of these. However, some of these high CTE metals may be unstable in the atmosphere or may pose unacceptable health and safety risks.

Therefore, in embodiments, the cap skirt 160 can be constructed of a composite material comprising aluminum metal or high CTE metal alloy comprising one or more of zinc (Zn), aluminum (Al), magnesium (Mg), copper (Cu), or combinations of these. In embodiments, the cap skirt 160, or the annular body 162 of the cap skirt 160, may comprise Zn or Mg to increase the CTE of the cap relative to aluminum. In embodiments, the cap skirt 160 or the annular body 162 of the cap skirt 160 may comprise a metal alloy comprising one or more of zinc, aluminum, magnesium, copper, or combinations of these. In embodiments, the cap skirt 160, or the annular body 162 of the cap skirt 160, may comprise an alloy of Zn, such as a Zn alloy comprising one or more metals selected from the group consisting of Al, Mg, Cu, and combinations of these. Alloys of Zn may have CTE that can be as much as 15% greater than the CTE of a metal consisting of aluminum. In embodiments, the metal alloy of the cap skirt 160, or the annular body 162 of the cap skirt 160, may comprise less than or equal to 5 wt. % Al. In embodiments, the metal-containing cap 108 may comprise other metallic alloys, such as a suitable Pb—Sn alloy. In embodiments, the high CTE metal or metal alloy of the cap skirt 160 may be a crimpable metal or metal alloy. Metals and metallic alloys may beneficially be used with existing crimping processes. As such, current bottling processes need not be significantly modified to obtain the improved seals described herein.

In embodiments, the entire cap skirt 160, including the annular body 162, the crimp region 164, and the attachment flange 166, may be constructed of the high CTE metal alloy, such as any of the high CTE metal alloys previously described herein. In embodiments, the annular body 162 of the cap skirt 160 may comprise the high CTE metal alloy, and the crimp region 164, the attachment flange 166, or both may comprises a metal or metal alloy that is different from the high CTE metal alloy of the annular body 162.

In embodiments, the cap skirt 160, in particular the annular body 162 of the cap skirt 160, may be constructed of a polymer-metal composite material. In embodiments, the cap skirt 160, in particular the annular body 162 of the cap skirt 160, may be constructed of a metal-polymer composite comprising a polymer matrix coated with a metal-containing coating. In embodiments, the cap skirt 160, in particular the annular body 162 of the cap skirt 160, may be constructed of a metal-polymer composite comprising a metal matrix having polymer-based reinforcements disposed therein. The polymer-based reinforcements may be dispersed throughout the aluminum matrix. In these embodiments, the polymer may have a high CTE, such as a CTE of greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, greater than or equal to $500\times10^{-7}$ $K^{-1}$, or even greater than or equal to $1000\times10^{-7}$ $K^{-1}$ (at 20° C. and/or at temperatures less than or equal to the glass transition temperature of the stopper 106) so that the CTE of the polymer-metal composite material is greater than the CTE of aluminum metal (i.e., metal consisting of aluminum). The metal of the polymer-metal composite materials may any of the metals or metal alloys previously discussed herein. In embodiments, the metal of the polymer-metal composite materials may be aluminum or an aluminum-containing alloy.

Referring again to FIG. 5, in embodiment, the cap 108 may be a polymer-metal composite structure comprising a polymer having a high CTE and a crimpable metal for the crimp region 164 of the cap skirt 160. In particular, the cap 108 may include the cap skirt 160 that may be a polymer-metal composite structure. In embodiments, the annular body 162 of the cap skirt 160 may comprise a polymer having a high CTE, and the crimp region 164 of the cap skirt 160 may comprise a crimpable metal, such as an aluminum-containing metal, coupled to the polymer of the annular body 162. Aluminum-containing metals may include aluminum metal or an aluminum-containing metal alloy. The crimpable metal of the crimp region 164 may be coupled directly to the polymer material of the annular body 162 at the bottom end of the annular body 162 (e.g., the end of the annular body 162 oriented in the −Z direction of the coordinate axis in FIG. 5). In embodiments, the crimp region 164 comprising the crimpable metal may be molded into the polymer material of the annular body 162.

The annular body 162 may comprise a polymer having a high CTE that is greater than the CTE of a metal consisting of aluminum. In embodiments, the attachment flange 166 may also comprise the polymer material having high CTE. The polymer material of the annular body 162 may have a CTE of greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, greater than or equal to $500\times10^{-7}$ $K^{-1}$, or even greater than or equal to $1{,}000\times10^{-7}$ $K^{-1}$. In embodiments, The polymer material of the annular body 162 may have a CTE of greater than $255\times10^{-7}$ $K^{-1}$, greater than or equal to $280\times10^{-7}$ $K^{-1}$, greater than or equal to $300\times10^{-7}$ $K^{-1}$, greater than or equal to $355\times10^{-7}$ $K^{-1}$, greater than or equal to $400\times10^{-7}$ $K^{-1}$, greater than or equal to $500\times10^{-7}$ $K^{-1}$, or even greater than or equal to $1{,}00\times10^{-7}$ $K^{-1}$ at temperatures less than or equal to the glass transition temperature $T_g$ of the stopper 106 (e.g., ≤−45° C.). The polymer may have a CTE of less than or equal to $3{,}000\times10^{-7}$ $K^{-1}$, such as less than or equal to $2500\times10^{-7}$ $K^{-1}$, or less than or equal to $2000\times10^{-7}$ $K^{-1}$. In embodiments, the polymer of the annular body 162 may have a CTE of from greater than $255\times10^{-7}$ $K^{-1}$ to $3000\times10^{-7}$ $K^{-1}$, from $260\times10^{-7}$ $K^{-1}$ to $3000\times10^{-7}$ $K^{-1}$, from $260\times10^{-7}$ $K^{-1}$ to $2500\times10^{-7}$ $K^{-1}$, from $260\times10^{-7}$ $K^{-1}$ to $2000\times10^{-7}$ $K^{-1}$, from $300\times10^{-7}$ $K^{-1}$ to $3000\times10^{-7}$ $K^{-1}$, from $300\times10^{-7}$ $K^{-1}$ to $2500\times10^{-7}$ $K^{-1}$, from $300\times10^{-7}$ $K^{-1}$ to $2000\times10^{-7}$ $K^{-1}$, from $350\times10^{-7}$ $K^{-1}$ to $3000\times10^{-7}$ $K^{-1}$, from $350\times10^{-7}$ $K^{-1}$ to $2500\times10^{-7}$/K, from $350\times10^{-7}$ $K^{-1}$ to $2000\times10^{-7}$ $K^{-1}$, from $400\times10^{-7}$ $K^{-1}$ to $3000\times10^{-7}$ $K^{-1}$, from $400\times10^{-7}$ $K^{-1}$ to $2500\times10^{-7}$ $K^{-1}$, from $400\times10^{-7}$ $K^{-1}$ to $2000\times10^{-7}$ $K^{-1}$, from $500\times10-7$ $K^{-1}$ to $3000\times10^{-7}$ $K^{-1}$, from $500\times10^{-7}$ $K^{-1}$ to $2500\times10^{-7}$ $K^{-1}$, or from $500\times10^{-7}$ $K^{-1}$ to $2000\times10^{-7}$ $K^{-1}$.

The polymer material for the annular body 162 of the cap skirt 160 may be any polymer having a high CTE greater in the above ranges, such as but not limited to high density polyethylene (HDPE), acrylonitrile butadiene styrene polymer (ABS), polypropylene (PP), ultra-high molecular weight polyethylene (UHMWPE), or other high CTE polymers. In embodiments, the polymer material may be a high CTE plastic. In embodiments, the annular body 162 of the cap skirt 160 may comprise a polymer selected from the group consisting of HDPE, ABS, PP, UHMWPE, and combinations thereof.

For most common polymer materials, the Young's modulus of the polymer material is very low compared to metals used for existing metal crimp caps, even though the polymer materials can have a much greater CTE compared to the metals. The reduced Young's modulus of the polymer material may result in a reduction in stiffness of the cap skirt 160, which may cause the cap skirt 160 to flex during cooling. The flexing of the cap skirt 160 during cooling may reduce the amount of force exerted by the cap 108 on the stopper 106, thereby increasing the probability of loss of CCI when the sealed glass container 100 is cooled to temperatures less than −80° C. Thus, any benefit to the sealing force provided by the increase in CTE of the polymer material may be reduced due to the reduced stiffness of the polymer material.

Figure 14:
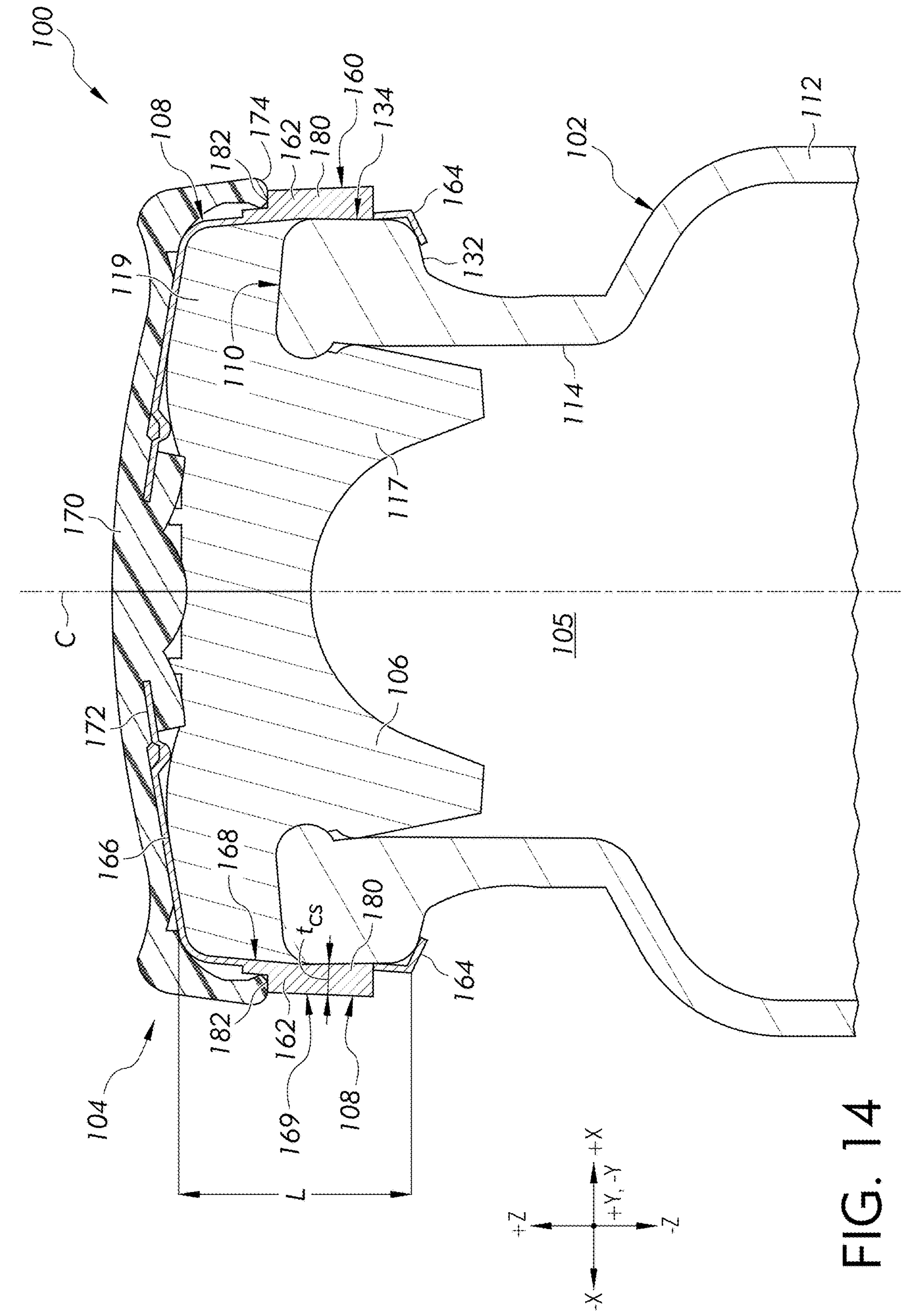
FIG. 14 schematically depicts a cross-sectional view of another embodiment of a cap of a sealing assembly for sealing a glass container, according to one or more embodiments described herein.

Referring now to FIG. 14, to ensure the polymer portions of the cap skirt 160 are strong enough to enable the cap 108 to hold the stopper 108 tightly against the upper sealing surface 110 with sufficient sealing force, the stiffness of the cap skirt 160, in particular the annular body 162 of the cap skirt 160, may be increased. The stiffness of the annular body 162 of the cap skirt 160 can be increased by increasing the radial thickness $t_{CS}$ of the annular body 162 of the cap skirt 160. The radial thickness $t_{CS}$ of the annular body 162 may be the distance between the inner surface 168 of the annular body 162 and the outer surface 169 of the annular body along a radial line perpendicular to the center axis C of the sealed glass container 100 and extending radially outward from center axis C. The stiffness of the annular body 162 is defined by the following Equation 5.

$$k = E \times \frac{A}{L} \tag{5}$$

In Equation 5, k is the stiffness, E is the Young's modulus, A is the cross-sectional area of the annular body 162 of the cap skirt 160, and L is the axial length of the annular body 162 of the cap skirt 160. The cross-sectional area A is the cross-section taken by a plane that is perpendicular to the center axis C of the sealed glass container 102. The length L of the annular body 162 is the length of the annular body 162 in a direction parallel to the center axis C of the sealed glass container 100 (i.e., in the +/−Z direction of the coordinate axis in FIG. 14).

The annular body 162 of the cap skirt 160 may have a stiffness that is within 20% of a stiffness of a comparable cap skirt annular body consisting of aluminum metal and having a radial thickness of 0.19 mm and identical axial length L. In other words, an absolute difference between the stiffness of the polymeric annular body 162 of the cap skirt 160 and the stiffness of the comparable cap skirt annular body consisting of aluminum metal and having a radial thickness of 0.19 mm and identical axial length L is less than or equal to 20% of the stiffness of the comparable cap skirt annular body consisting of aluminum metal and having a radial thickness of 0.19 mm and identical axial length L. A ratio of the stiffness of the annular body 162 of the cap skirt 160 to the stiffness of the comparable cap skirt annular body consisting of aluminum metal and having a radial thickness of 0.19 mm and identical axial length L may be greater than 0.8, such as from 0.8 to 1.2.

In embodiments, the annular body 162 of the cap skirt 160 may have a stiffness that is within 30% of a stiffness of the compressed rubber stopper 106 at temperatures less than or equal to the glass transition temperature $T_g$ of the stopper 106 (e.g., ≤−45° C.). Considering the need to maintain 20% of the seal surface of the rubber stopper 106 on the upper sealing surface 110 of the flange 126, the stiffness of the annular body 162 of the cap skirt 160 can be estimated from the following Equation 6.

$$0.7 \le \frac{(E_{polymer} \times A_{polymer}) \times L_{stopper}}{(E_{stopper} \times A_{flange\ top\ surface} \times 0.20) \times L_{polymer}} \tag{6}$$

In Equation 6, $E_{polymer}$ and $A_{polymer}$ are the Young's modulus and area, respectively, of the annular body 162 constructed of the polymer material, $E_{stopper}$ is the Young's modulus of the stopper 106, $A_{flange\ top\ surface}$ is the seal surface area of the upper sealing surface 110 of the flange 126 of the glass container 102, $L_{stopper}$ is the axial length of the stopper 106, and $L_{polymer}$ is the axial length of the cap skirt. In most cases, an inner radius of the annular body 162 comprising the polymer material is about the same as the inner radius of the comparable cap skirt annular body consisting of aluminum metal. Thus, one method to change the stiffness is to change the thickness δt of the annular body 162 comprising the polymer material. Equation 6 can be approximated by the following Equation 7.

$$0.7 \le \frac{(E_{polymer} \times \delta t_{polymer}) \times L_{stopper}}{(E_{stopper} \times \delta t_{flange\ top\ surface} \times 0.20) \times L_{polymer}} \le 1.2 \tag{7}$$

In embodiments, the annular body 162 of the cap skirt 160 may comprise the polymer material having a CTE of greater than $255\times10^{-7}$ $K^{-1}$, greater than or equal to $280\times10^{-7}$ $K^{-1}$, greater than or equal to $300\times10^{-7}$ $K^{-1}$, greater than or equal to $350\times10^{-7}$ $K^{-1}$ or even greater than or equal to $400\times10^{-7}$ $K^{-1}$, greater than or equal to $500\times10^{-7}$ $K^{-1}$, or even greater than or equal to $1{,}00\times10^{-7}$ $K^{-1}$. Additionally, the annular body 162 of the cap skirt 160 may have a thickness sufficient so that the ratio of the stiffness of the annular body 162 of the cap skirt 160 to the stiffness of the compressed stopper 106 at the glass transition temperature $T_g$ of the stopper 106 is greater than or equal to 0.7. In embodiments, the annular body 162 may have a radial thickness $t_{CS}$ of greater than 0.19 mm, such as greater than or equal to 0.20 mm, greater than or equal to 0.21 mm, greater than or equal to 0.25 mm, greater than or equal to 0.50 mm, or even greater than or equal to 1 mm.

Figure 12:
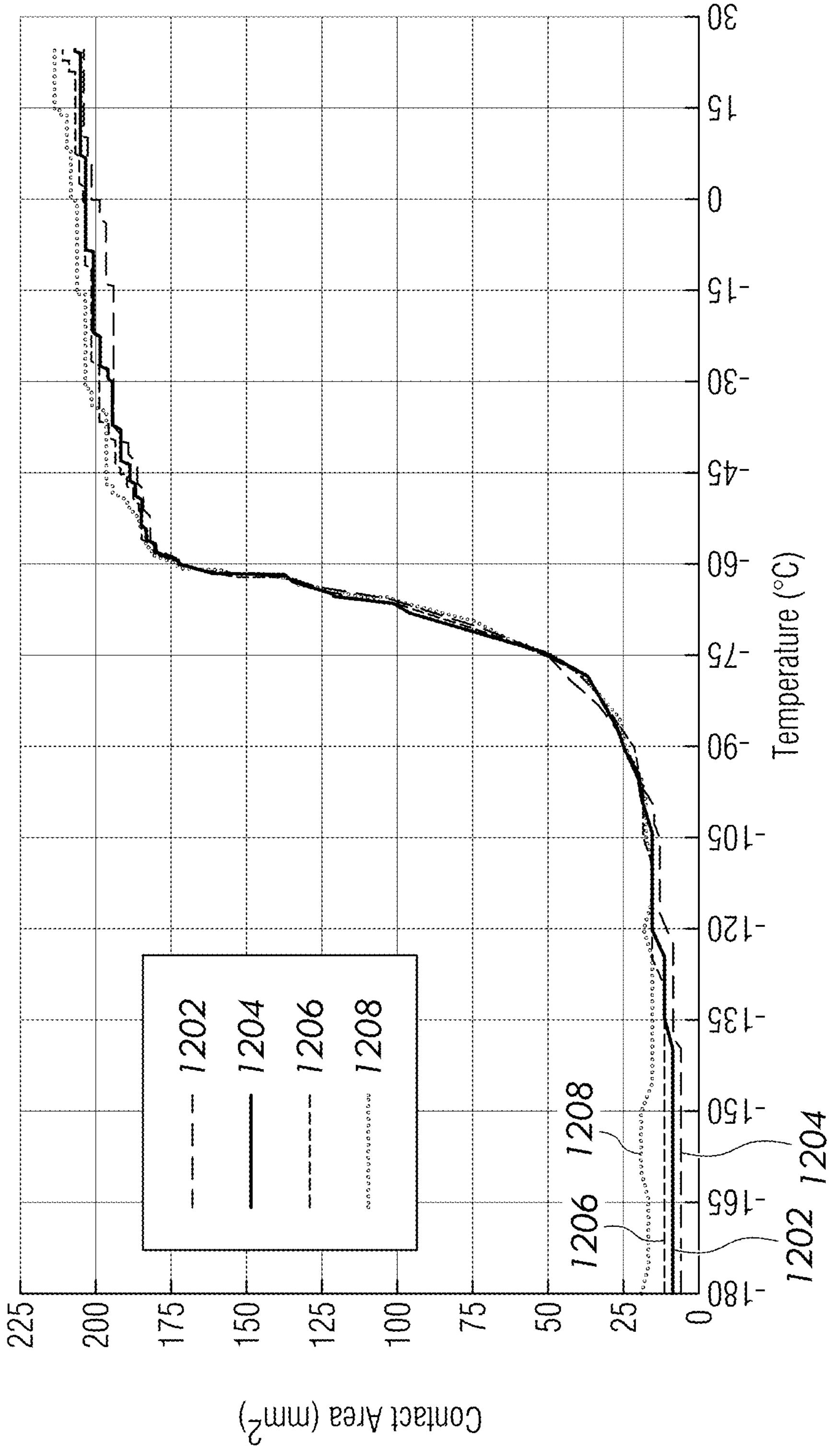
FIG. 12 graphically depicts a plot of contact area (y-axis) between the flange and the stopper as a function of temperature (x-axis) for a plurality of sealed glass containers cooled at a constant cooling rate, where the sealing assemblies of the sealed glass containers have caps with different stiffness, according to one or more embodiments described herein.

It has also been found that increasing the stiffness of the cap 108 by itself can also increase the seal pressure and decrease the probability of CCI failure independent of increasing the CTE of the material comprising the cap 108. Referring now to FIG. 12, the contact area (y-axis) between the stopper 106 and the upper sealing surface 110 as a function of temperature (x-axis) is graphically depicted for cap skirts 160 having constant CTE of $255\times10^{-7}$ $K^{-1}$ at 20° C. and increasing stiffness. In FIG. 12, the line indicated by reference number 1202 provides data for a typical cap skirt consisting of aluminum metal and having a thickness of 0.19 mm. For reference number 1204, the stiffness of cap skirt 160 was increased by 1.5 times the stiffness of the typical cap skirt of reference number 1202, while keeping the CTE constant. For reference number 1206, the stiffness was increased by 2 times the stiffness of the typical cap skirt (ref no. 1202), and for reference number 1208, the stiffness was increased by 4 times the stiffness of the typical cap skirt (ref.

no. 1202). The CTE was held constant. As shown in FIG. 12, as the stiffness of the cap skirt 160 increases, the contact area between the stopper 106 and the upper sealing surface 110 increases at temperatures less than about −100° C. At a temperature of −180° C., increasing the stiffness by a factor of 2 nearly doubles the contact area between the stopper 106 and the upper sealing surface 110. Thus, the contact area between the stopper 106 and the upper sealing surface 110 can be increased at temperatures less than −100° C., −110° C., −120° C., −150° C., or even −180° C. by increasing the stiffness of the cap skirt 160, thereby decreasing the probability of CCI failure at these reduced storage temperatures.

Referring again to FIG. 5, in embodiments, at least a portion of or all of the cap skirt 160 may have a stiffness that is greater than or equal to 2 times a stiffness of a comparable cap skirt annular body consisting of aluminum metal and having a radial thickness of 0.19 mm and identical axial length. In embodiments, at least a portion of or all of the annular body 162 of the cap skirt 160 may have a stiffness that is greater than or equal to 2 times a stiffness of a comparable cap skirt annular body consisting of aluminum metal and having a radial thickness of 0.19 mm and identical axial length. The stiffness of the cap skirt 160, in particular the annular body 162 of the cap skirt 160, can be increased by increasing the Young's modulus of the material comprising the cap skirt 160, changing the geometry of the cap skirt 160 (e.g., increasing the thickness $t_{CS}$ of the annular body 162), or both.

The Young's modulus of the cap skirt 160 can be increased by constructing at least a portion of or all of the cap skirt 160, in particular at least a portion of the annular body 162 of the cap skirt 160, from a metal or metal alloy having a Young's modulus greater than the Young's modulus of aluminum metal or an aluminum alloy. In embodiments, the cap skirt 160, in particular the annular body 162 of the cap skirt 160, may comprise a metal or metal alloy having a Young's modulus that is greater than or equal to 2 times the Young's modulus of a metal consisting of aluminum or an aluminum-based alloy, where an aluminum-based alloy refers to a metal alloy comprising at least 50 wt. % aluminum. Aluminum and aluminum-based alloys have Young's moduli in the range of from 67 GPa to 73 GPa. In embodiments, the cap skirt 160, in particular the annular body 162 of the cap skirt 160, may comprise a metal or metal alloy having a Young's modulus that is greater than or equal to 134 GPa, greater than or equal to 140 GPa, greater than or equal to 145 GPa, greater than or equal to 150 GPA, or even greater than or equal to 160 GPa. Examples of suitable metals may include but are not limited to iron, nickel, steel, and alloys of iron, nickel, or steel. In embodiments, the cap skirt 162 and crimp region 164 may be constructed of the same metal or metal alloy having a Young's modulus greater than or equal to 134 GPa. In other embodiments, the cap skirt 162 can be the metal or metal alloy having Young's modulus greater than or equal to 134 GPa, and the crimp region 164 can comprise an aluminum or aluminum-based alloy having a lesser Young's modulus.

Referring again to FIG. 14, the stiffness of the cap skirt 160, or the annular body 162 of the cap skirt 160, can also be increased by modifying the geometry of the annular body 162. For constant axial length L of the annular body 162, the stiffness of the annular body 162 of the cap skirt 160 can be increased by increasing the radial thickness $t_{CS}$ of at least a portion of or all of the annular body 162 of the cap skirt 160. In embodiments, at least a portion of or all of the annular body 162 of the cap skirt 160 may have a radial thickness $t_{CS}$ that is greater than a radial thickness of a typical commercially available cap skirt comprising aluminum metal so that the stiffness of the annular body 162 of the cap skirt 160 is greater than or equal to 2 times the stiffness of the typical commercially-available cap skirt comprising aluminum metal. In embodiments, at least a portion of or all of the annular body 162 of the cap skirt 160 may have a radial thickness $t_{CS}$ that is greater than or equal to $2^{1/3}$ times the radial thickness of a typical commercially-available cap skirt comprising aluminum metal. In embodiments, at least a portion of or all of the annular body 162 of the cap skirt 160 may have a radial thickness $t_{CS}$ that is greater than or equal to 0.22 mm, greater than or equal to 0.23 mm, greater than or equal to 0.24 mm, greater than or equal to 0.25 mm, or even greater than or equal to 0.30 mm.

In embodiments, the stiffness of the cap skirt 160 may be increased by both increasing the Young's modulus of the material comprising the annular body 162 of the cap skirt 160 and increasing the radial thickness $t_{CS}$ of at least a portion of the annular body 162 of the cap skirt 160. Thus, a combination of an increase in Young's modulus and an increase in radial thickness $t_{CS}$ of the annular body 162 of the cap skirt 160 can increase the stiffness of the cap skirt 160 to greater than or equal to 2 times the a stiffness of a comparable cap skirt annular body consisting of aluminum metal and having a radial thickness of 0.19 mm and identical axial length. In embodiments, the annular body 162 of the cap skirt 160 may comprise a material having a Young's modulus of greater than 73 GPa, such as from greater than 73 GPa to 140 GPa or even greater than 140 GPa, and at least a portion of the annular body 162 of the cap skirt 160 may have a radial thickness $t_{CS}$ of greater than 0.19 mm, greater than or equal to 20 mm, greater than or equal to 21 mm, or even greater than or equal to 22 mm, such that the combination of Young's modulus and radial thickness $t_{CS}$ of the annular body 162 result in the cap skirt 160 having a stiffness greater than or equal to 2 times the a stiffness of a comparable cap skirt annular body consisting of aluminum metal and having a radial thickness of 0.19 mm and identical axial length.

Figure 13:
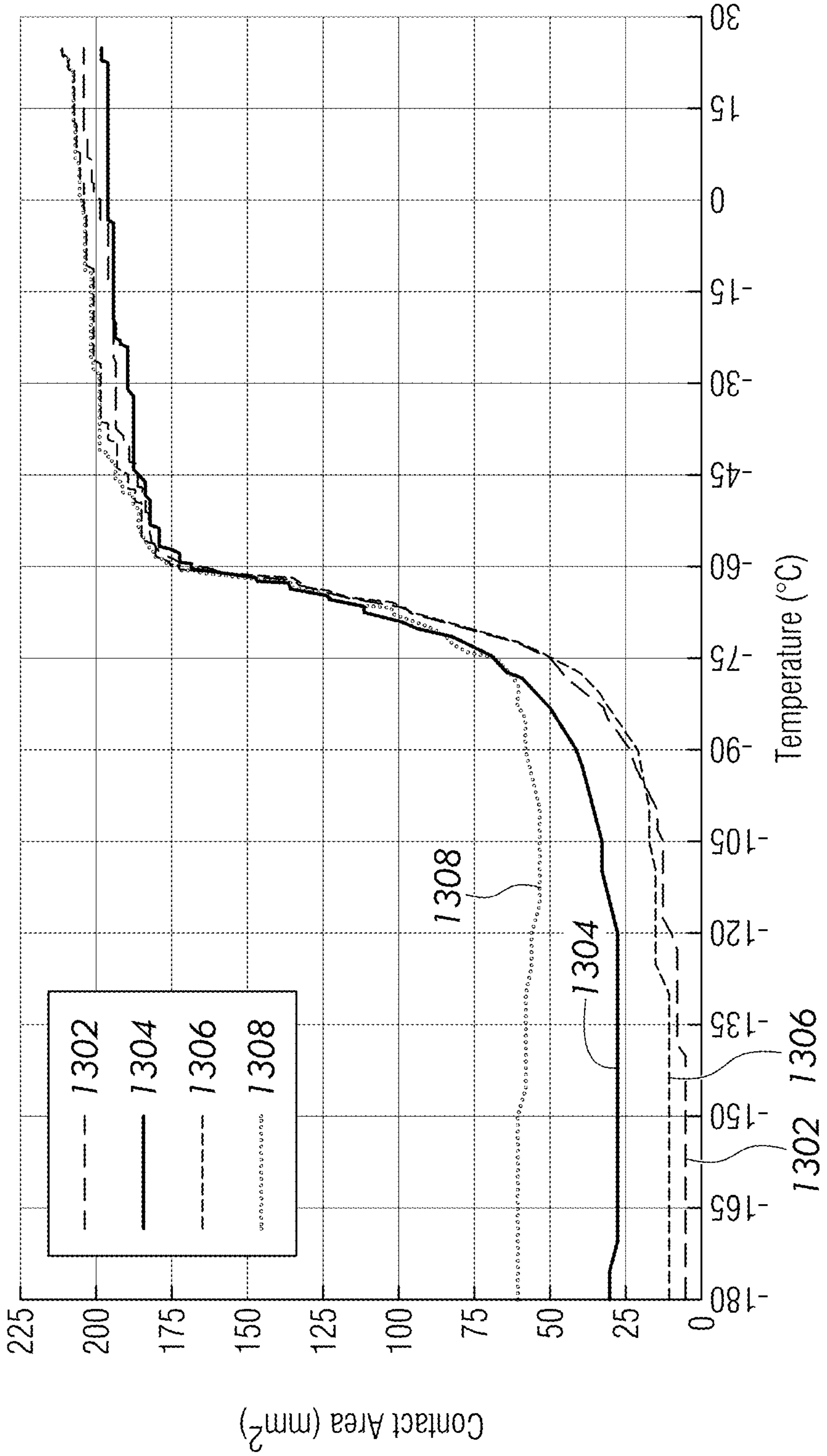
FIG. 13 graphically depicts a plot of contact area (y-axis) between the flange and the stopper as a function of temperature (x-axis) for a plurality of sealed glass containers cooled at a constant cooling rate, where the sealing assemblies of the sealed glass containers have caps with different CTE and stiffness, according to one or more embodiments described herein.

Additionally, the inventors of the present disclosure have also discovered that increasing the CTE of the cap skirt 160 in combination with increasing the stiffness of the cap skirt 160 produces a synergistic effect that further improves the contact area and seal pressure between the stopper 106 and the upper sealing surface 110 of the flange 126 beyond the contact area and seal pressure that would be achievable with only one of increasing the CTE or increasing the stiffness. Referring now to FIG. 13, the contact area (y-axis) between the stopper 106 and the upper sealing surface 110 as a function of temperature (x-axis) for sealed glass containers 100 having cap skirts 160 with different CTE and stiffness is graphically depicted. In FIG. 13, the line indicated by reference number 1302 shows the contact area as a function of temperature for a sealed glass container 102 for which the cap skirt 160 has a CTE of $236\times10^{-7}$ $K^{-1}$ and a first stiffness. The first stiffness corresponds to the stiffness of a cap skirt consisting of aluminum and having a radial thickness of 0.19 mm. The cap skirt of reference number 1302 had a contact area of less than 10 $mm^2$ at temperatures less than −120° C. For reference number 1304, the stiffness of the cap skirt 160 was increased to a stiffness of 1.5 times the first stiffness. As shown in FIG. 13, increasing the stiffness by 1.5 times the first stiffness (ref. no. 1304) resulted in an increase in the contact area, but the contact area was still around 12 $mm^2$. For reference number 1306, the cap skirt 160 had a stiffness equal to the first stiffness (same as reference no. 1302), but the CTE of the cap skirt 160 was increased to $352\times10^{-7}$ $K^{-1}$.

As shown in FIG. 13, keeping the stiffness the same and only increasing the CTE of the cap skirt 160 increased the contact area to a range of between 25 $mm^2$ and 30 $mm^2$ at temperatures between −120° C. and −180° C.

For reference number 1308, the CTE of the cap skirt 160 was increased to $352\times10^{-7}$ $K^{-1}$ and the stiffness of the cap skirt 160 was increased to 1.5 times the first stiffness. As shown in FIG. 13, increasing both the CTE and stiffness (ref no. 1308) resulted in the contact area increasing to between 50 $mm^2$ and 62 $mm^2$ at temperatures between −120° C. and −180° C., which was over 2 times the increase in contact area achieved by increasing the CTE to $352\times10^{-7}$ $K^{-1}$ alone without changing the stiffness. The results are unexpected because the observed increase in contact area resulting from increasing the CTE and stiffness is substantially greater than merely adding the individual effects of increasing the CTE (ref. no. 1304) and increasing the stiffness (ref no. 1306). Merely adding the effects shown for reference numbers 1304 and 1306 would be expected to result in a contact area in a range of 35 $mm^2$ to 38 $mm^2$ at temperatures of from −120° C. to −180° C. However, increasing the CTE and the stiffness of the cap skirt 160 simultaneously (ref no. 1308) resulted in a contact area of from 55 $mm^2$ to 62 $mm^2$ over the temperature range of −120° C. to −180° C., which is almost two times the contact area expected by just adding the individual effects (i.e., adding the difference between 1304 and 1302 to the difference between 1306 and 1302).

In embodiments, the cap skirt 160 may have a CTE of greater than $255\times10^{-7}$ $K^{-1}$, greater than or equal to $280\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$, or even greater than or equal to $500\times10^{-7}$ $K^{-1}$ and may have a stiffness that is greater than a stiffness of a comparable cap skirt annular body consisting of aluminum metal and having a radial thickness of 0.19 mm and identical axial length. The stiffness of the cap skirt 160 may be greater than or equal to 1.2 times, greater than or equal to 1.3 times, greater than or equal to 1.4 times, greater than or equal to 1.5 times, or greater than or equal to 2.0 times the stiffness of a comparable cap skirt annular body consisting of aluminum metal and having a radial thickness of 0.19 mm and identical axial length.

As previously discussed, the stiffness of the cap skirt 160 may be increased by increasing the Young's modulus of the annular body 162 of the cap skirt 160, increasing the thickness of at least a portion of the annular body 162 of the cap skirt 160, or both. The annular body 162 of the cap skirt 160 may have any of the features, materials, or characteristics previously described herein resulting in both increased CTE and increased stiffness of the cap skirt 160 compared to typical commercially-available cap skirts consisting of aluminum and having a thickness of 0.19 mm and identical axial length. In embodiments, the cap skirt 160 may comprise the annular body 162 comprising a material having a CTE greater than or equal to $260\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$, or even greater than or equal to $500\times10^{-7}$ $K^{-1}$, and a Young's modulus greater than 73 GPa, greater than or equal to 80 GPa, greater than or equal to 90 GPa, greater than or equal to 100 GPa, greater than or equal to 120 GPa, or even greater than or equal to 140 GPa. In embodiments, the cap skirt 160 may include the annular body 162 comprising a material having a CTE greater than or equal to $260\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$, or even greater than or equal to $500\times10^{-7}$ $K^{-1}$, and at least a portion of the annular body 162 may have a radial thickness $t_{CS}$ that is greater than or equal to 0.20 mm, greater than or equal to 0.21 mm, greater than or equal to 0.22 mm, greater than or equal to 0.23 mm, greater than or equal to 0.24 mm, greater than or equal to 0.25 mm, greater than or equal to 0.50 mm, or even greater than or equal to 1.0 mm. In embodiments, the cap skirt 160 may comprise the annular body 162 comprising: (1) a material having a CTE greater than or equal to $260\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$, or even greater than or equal to $500\times10^{-7}$ $K^{-1}$, and a Young's modulus greater than 73 GPa, greater than or equal to 80 GPa, greater than or equal to 90 GPa, greater than or equal to 100 GPa, greater than or equal to 120 GPa, or even greater than or equal to 140 GPa; and (2) at least a portion of the annular body 162 may have a radial thickness $t_{CS}$ that is greater than or equal to 0.20 mm, greater than or equal to 0.21 mm, greater than or equal to 0.22 mm, greater than or equal to 0.23 mm, greater than or equal to 0.24 mm, greater than or equal to 0.25 mm, greater than or equal to 0.5 mm, or even greater than or equal to 1.0 mm.

Referring again to FIG. 14, the cap 108 may have a cap skirt 160 comprising a polymer-metal composite structure and a top cover 170. At least a portion of the annular body 162 of the cap skirt 160 may comprise a polymer material having CTE greater than $255\times10^{-7}$ $K^{-1}$, greater than or equal to $260\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$, or even greater than or equal to $500\times10^{-7}$ $K^{-1}$, and the crimp region 162 may comprises a crimpable metal, such as aluminum metal or an aluminum metal alloy. The annular body 162 of the cap skirt 160 may have a reinforced region 180 where the radial thickness $t_{CS}$ is greater than or equal to 0.20 mm, greater than or equal to 0.21 mm, greater than or equal to 0.22 mm, greater than or equal to 0.23 mm, greater than or equal to 0.24 mm, greater than or equal to 0.25 mm, or even greater than or equal to 0.30 mm. The reinforced region 180 may comprise at portion of or all of the annular body 162. In embodiments, the reinforced region 180 may comprise at least 30%, at least 40%, at least 50%, at least 60%, or even at least 70% of the axial length L of the annular body 162 of the cap skirt 160. The radial thickness $t_{CS}$ of the annular body 162 may increase the stiffness of the cap skirt 160 to a stiffness that is greater than or equal to 1.2 times, greater than or equal to 1.3 times, greater than or equal to 1.4 times, greater than or equal to 1.5 times, or greater than or equal to 2.0 times the stiffness of a comparable cap skirt annular body consisting of aluminum metal and having a radial thickness of 0.19 mm and identical axial length. The cap skirt 160 may have both increased CTE and increased stiffness, which may enable the cap skirt 160 to maintain a contact area and seal pressure between the stopper 106 and the upper sealing surface 110 of the glass container 102 when the sealed glass container 100 is cooled to temperatures less than −80° C.

As shown in FIG. 14, the cap 108 may have the top cover 170 that is separate from the cap skirt 160 and removeably attachable to the cap skirt 160. In such embodiments, the top cover 170 may be removed from the cap skirt 160 prior to use of the sealed glass container 100, such as to provide access to the stopper 106 using a syringe or other device to withdraw the contents of the sealed glass container 100. The top cover 170 may be engageable with the attachment flange 166 of the cap skirt 160. In embodiments, the top cover 170 may include a slot 172 shaped to receive the attachment flange 166, where engagement of the attachment flange 166 with the slot 172 couples the top cover 170 to the cap skirt 160. In embodiments, the annular body 162 of the cap skirt 160 may have a notch 182 positioned to receive an end 174 of the top cover 170.

The top cover 170 may comprise a polymer material, such as a polymer having a CTE greater than $255\times10^{-7}$ $K^{-1}$, greater than or equal to $260\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$ or even greater than or equal to $500\times10^{-7}$ $K^{-1}$. In embodiments, the top cover 170 may be constructed of the same polymer material as the annular body 162 of the cap skirt 160. In embodiments, the top cover 170 may be a material different from the annular body 162 of the cap skirt 160.

Figure 15:
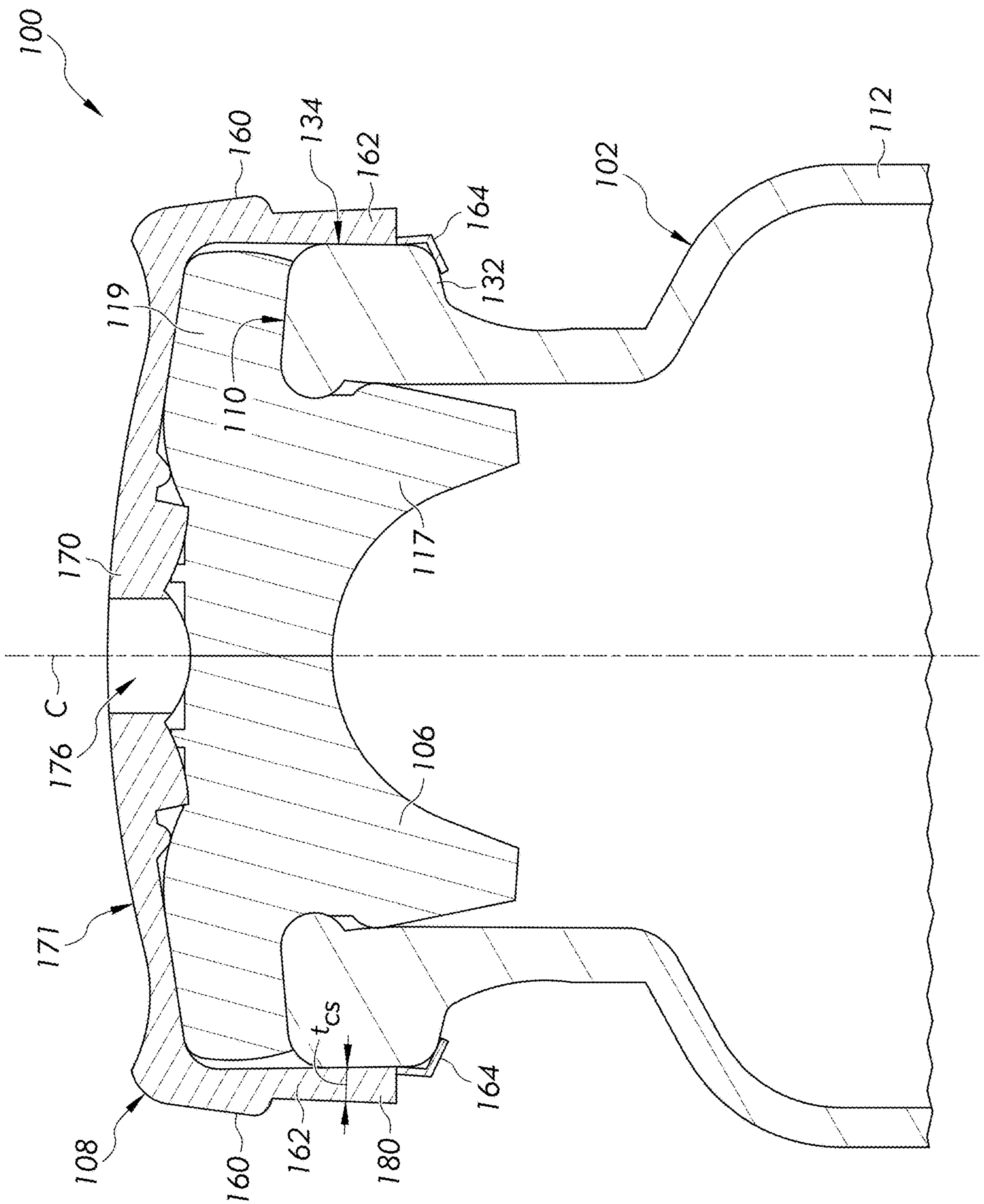
FIG. 15 schematically depicts a cross-sectional view of still another embodiment of a cap for a sealing assembly for sealing a glass container, according to one or more embodiments described herein FIG. 16 schematically depicts a cross-sectional view of yet another embodiment of a cap for a sealing assembly for sealing a glass container, according to one or more embodiments described herein.

Referring now to FIG. 15, in embodiments, the cap 108 may comprise a unitary structure in which the cap skirt 160 and top cover 170 are integrally formed together to produce the single unitary structure. In embodiments, the reinforced region 180 of the annular body 162 may extend from the crimp region 164 all the way to the top 171 of the top cover 170 portion of the cap 108. The cap 108 comprising the cap skirt 160 and top cover 170 integrally formed into a unitary structure may further comprise the crimp region 164 extending downwardly (e.g., generally in the −Z direction of the coordinate axis in FIG. 15) from the cap skirt 160 portion of the cap 108. The annular body 162 of the cap skirt 160 and the top cover 170 portion of the cap 108 may comprise a polymer material having a CTE greater than $255\times10^{-7}$ $K^{-1}$, greater than or equal to $260\times10^{-7}$ $K^{-1}$, greater than or equal to $300\times10^{-7}$ $K^{-1}$, greater than or equal to $350\times10^{-7}$ $K^{-1}$, even greater than or equal to $400\times10^{-7}$ $K^{-1}$, or even greater than or equal to $500\times10^{-7}$ $K^{-1}$.

The annular body 162 of the cap 108 may have any of the features, materials, or dimensions previously described herein for the annular body 162. In embodiments, the annular body 162 of the cap 108 may have an increased CTE, increased stiffness, or both according to any of the embodiments previously described herein. The increased CTE, increased stiffness, or both of the annular body 162 of the cap 108 may increase the seal pressure and contact area between the stopper 106 and the upper sealing surface 110 of the flange 126 of the glass container 102. The increased seal pressure and contact area provided by the caps 108 disclosed herein may reduce the probability of CCI failure.

When formed integrally into a unitary structure, the top cover 170 may not be removable from the cap skirt 160 of the cap 108. In embodiments, the top cover 170 portion of the cap 108 may include an opening 176 extending axially through the top cover 170 portion. The opening 176 may provide access to the stopper 106 enclosed by the cap 108. Access to the stopper 106 provided by the opening 176 in the top cover 170 portion may enable the contents of the sealed glass container 100 to be removed using a needle or other penetrating device to pierce through the stopper 106 and draw out the contents of the sealed glass container 100 without removing the cap 108 and stopper 106. The needle or other penetrating device may be passed through the opening 176 in the top cover 170 portion of the cap 108 and then passed through the stopper 106 and into the sealed glass container 100. The opening 176 in the top cover 170 portion of the cap 108 may be coaxial with the center axis C of the sealed glass container 100.

Figure 16:
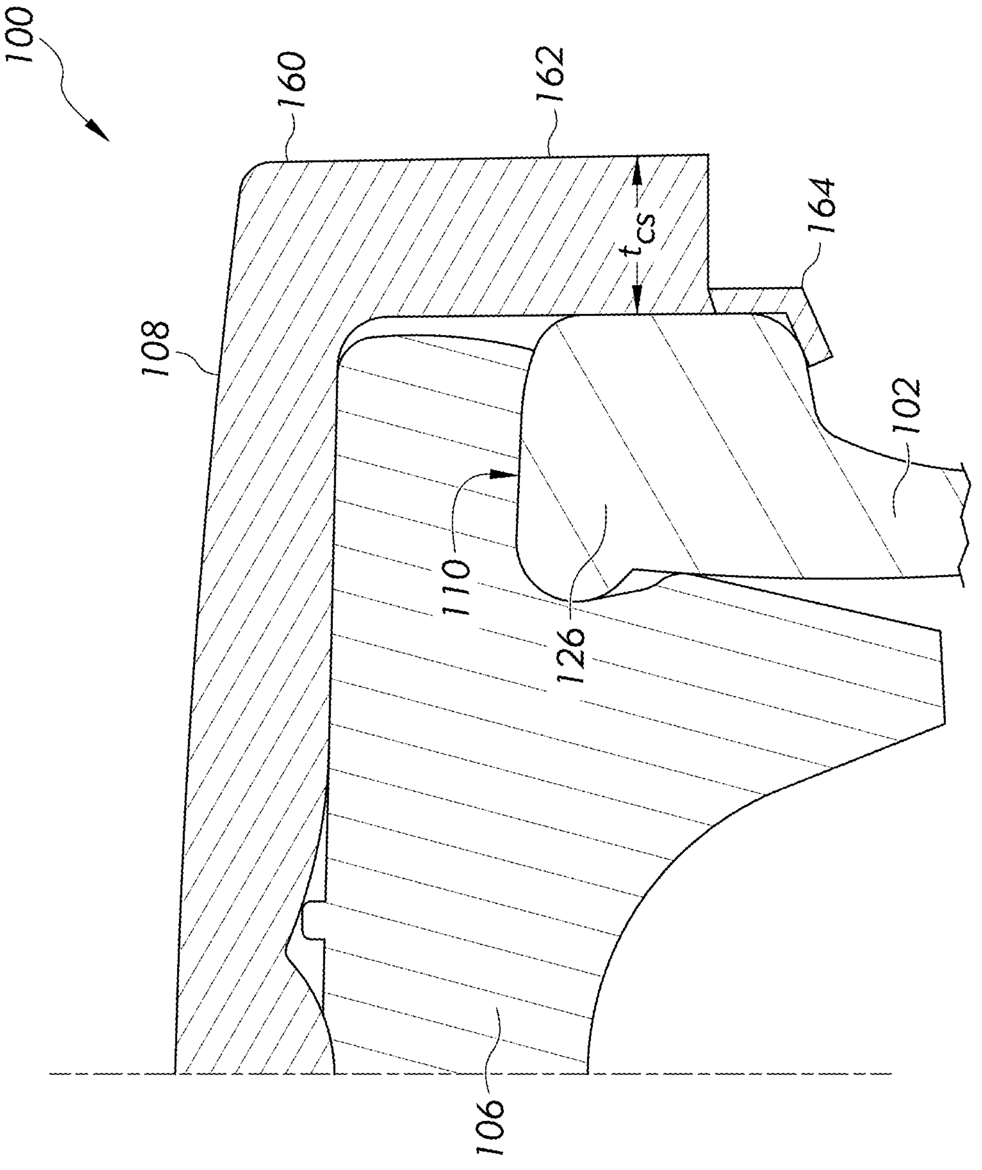
Figure 17A:
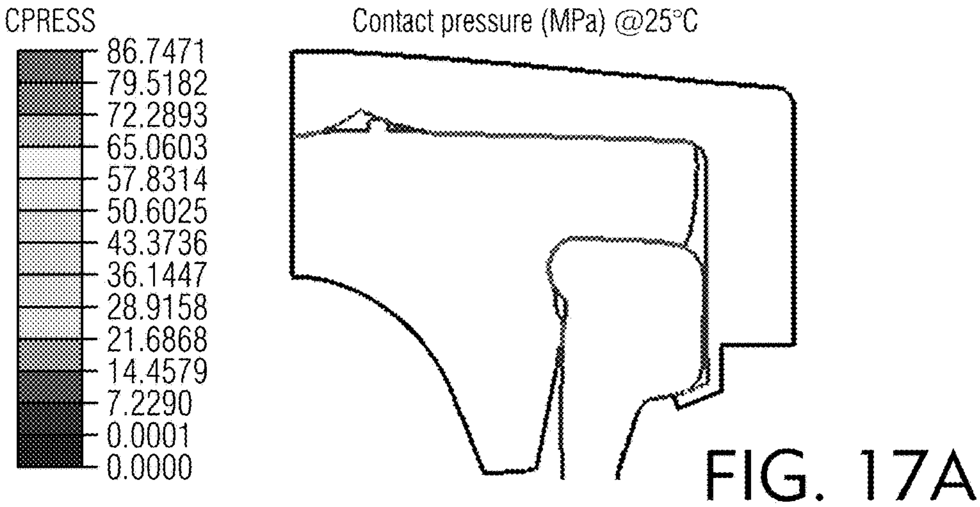
FIG. 17A depicts a simulation of compression of a stopper against a flange of a glass container by the cap of FIG. 16 at a storage temperature of 25° C., where the cap skirt has a high CTE of $1264\times10^{-7}$ $K^{-1}$ and increased stiffness, according to one or more embodiments described herein.
Figure 17B:
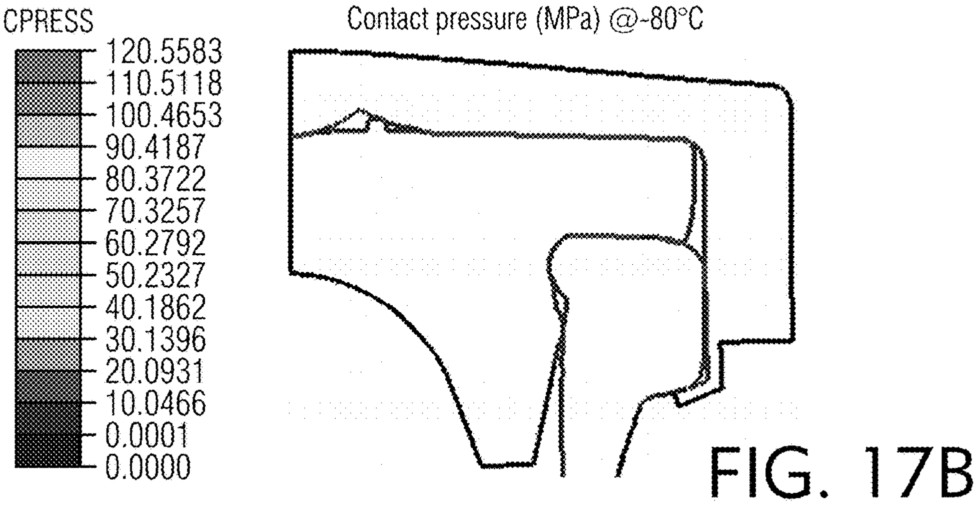
FIG. 17B depicts a simulation of compression of a stopper against a flange of a glass container by the cap of FIG. 16 at a storage temperature of −80° C., where the cap skirt has a high CTE of $1264\times10^{-7}$ $K^{-1}$ and increased stiffness, according to one or more embodiments described herein.
Figure 17C:
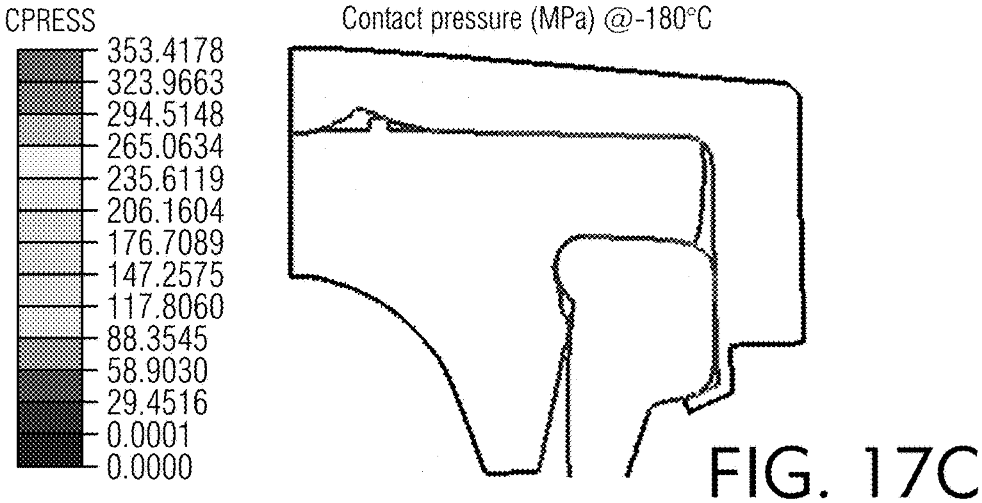
FIG. 17C depicts a simulation of compression of a stopper against a flange of a glass container by the cap of FIG. 16 at a storage temperature of −180° C., where the cap skirt has a high CTE of $1264\times10^{-7}$ $K^{-1}$ and increased stiffness, according to one or more embodiments described herein.

Referring now to FIG. 16, an embodiment of the cap 108 having a cap skirt 160 comprising an annular body 162 having high CTE and high stiffness is schematically depicted. The increased stiffness for the cap 108 in FIG. 16 is provided by increased radial thickness $t_{CS}$ of the annular body 162 of the cap skirt 160. Referring now to FIGS. 17A, 17B, and 17C, the seal pressure between the stopper 106 and the upper sealing surface 110 of the flange 126 of the glass container 102 for the cap 108 of FIG. 16 is simulated at different temperatures. The annular body of the cap skirt is constructed of high-density polyethylene (HDPE) having a CTE of $1{,}264\times10^{-7}$ $K^{-1}$ and a Young's modulus of only 1 GPa. The stiffness is increased by increasing the thickness of the annular body 162 of the cap skirt 160 from 0.2 mm to 2.14 mm. The seal pressure between the stopper 106 and the upper sealing surface 110 of the flange 126 was simulated at 25° C. (FIG. 17A), −80° C. (FIG. 17B), and −180° C. (FIG. 17C). As shown in FIGS. 17A, 17B, and 17C, the increased CTE and stiffness of the cap skirt 162 was able to maintain sufficient seal contact area and pressure between the stopper 106 and the upper sealing surface 110 even at temperatures down to −180° C.

Figure 18:
FIG. 18 graphically depicts a plot of contact area (y-axis) between the flange and the stopper as a function of temperature (x-axis) for a sealed glass container comprising the cap of FIG. 16 having a CTE of $1264\times10^{-7}$ $K^{-1}$ and thickness of 2.14 mm cooled at a constant cooling rate compared to a convention cap constructed of aluminum and having a thickness of 0.2 mm cooled at a constant cooling rate, according to one or more embodiments described herein.

Referring now to FIG. 18, contact area (y-axis) between the upper sealing surface 110 of the flange 126 and the stopper 106 as a function of temperature (x-axis) for a sealed glass container comprising the cap 108 of FIG. 16 having a CTE of $1264\times10^{-7}$ $K^{-1}$ at 20° C. and thickness of 2.14 mm cooled at a constant cooling rate is shown and compared to the contact area for a sealed glass container comprising a conventional cap constructed of aluminum and having a thickness of 0.2 mm. In FIG. 18, reference number 1802 refers to the sealed container comprising the conventional cap constructed of aluminum metal and having a thickness of the annular body of 0.2 mm. Reference number 1804 refers to the sealed glass container comprising the cap of FIG. 16 having an HDPE cap skirt with a CTE of $1264\times10^{-7}$ $K^{-1}$ at 20° C., a Young's modulus of 1 GPa, and a thickness of 2.14 mm. As shown in FIG. 18, the contact area for the sealed glass container comprising the cap of FIG. 16 having greater CTE and stiffness provided substantially greater contact area compared to the sealed glass container comprising conventional cap constructed of aluminum at temperatures less than −80° C. In particular, the cap of FIG. 16 (1804) provided nearly 10 times the contact area compared to the conventional aluminum cap (1802) at temperatures less than −80° C.

The caps 108 disclosed herein having increased CTE, increased stiffness, or both may increase the seal pressure and contact area between the stopper 106 and the upper sealing surface 110 of the flange 126 of the glass container 102. The increased seal pressure and contact area provided by the caps 108 disclosed herein may reduce the probability of CCI failure. In particular, the caps 108 disclosed herein may enable the sealed glass containers 100 to maintain a helium leakage rate of the sealed glass container 100 of less than or equal to $1.4\times10^{-6}$ $cm^3/s$ as the sealed pharmaceutical container is cooled to a temperature of less than or equal to −45° C., less than or equal to −80° C., less than or equal to −100° C., less than or equal to −120° C., or even less than or equal to −180° C.

The caps 108 disclosed herein may be utilized in combination with other features of the glass container 102, stopper 106, or both to further reduce the probability of CCI failure at low storage temperatures of less than −80° C. Referring again to FIGS. 1-4, the structure of the glass container 102 may be modified to deviate from existing glass containers to provide greater compression of the stopper 106 during the process of crimping the cap 108. Referring again to FIG. 2, the upper sealing surface 110 may include an inclined sealing surface 140. The inclined sealing surface 140 extends between the outer surface 134 of the flange 126 and the inner surface 114 of the glass container 102. The inclined sealing surface 140 may extends at an angle 150 to a plane 152 extending through an end 154 of the opening 105. The plane 152 may be a planar surface that rests on top of the glass container 102 at the opening 105 (e.g., that rests on peaks of the inclined sealing surface 140) and is perpendicular to the center axis C of the glass container 102 (e.g., in the X-direction depicted in FIG. 1).

The angle 150, as described herein, may be referred to as a “flange angle.” Flange angles relative to the plane 152 may be measured in a variety of different ways. For example, in embodiments, to determine an extension direction for the inclined sealing surface 140, an image may be captured of the glass container 102, and image processing techniques may be used to determine the angle 150 of the inclined sealing surface 140 (relative to the plane 152). In embodiments, the extension direction of the inclined sealing surface 140 is measured via finding a plane that extends between a peak of the inclined sealing surface 140 (e.g., having the greatest distance in the +/−Z direction from the underside surface 132) and a second highest point on the inclined sealing surface 140 (e.g., the extension direction of the inclined sealing surface 140 is measured via a plane that rests on the peak of the inclined sealing surface and another point of the inclined sealing surface 140 that is lower than the peak relative to the plane 152). In embodiments, the extension direction of the inclined sealing surface 140 is measured via connecting points on the inclined sealing surface 140 that are a predetermined distance (e.g., 0.1 mm, 0.2 mm, 0.5 mm, 1.0 mm, etc.) outward from the inner surface 114 and inward of the outer surface 134 (e.g., the points may be taken at a uniform distribution of spatial points extending between the inner surface 114 and the outer surface 134). In embodiments, the extension direction of the inclined sealing surface 140 is measured by curve fitting a linear plane to a plurality of different points distributed throughout the entirety of the inclined sealing surface 140.

In embodiments, the angle 150 may be greater than 5 degrees and less than or equal to 45 degrees (e.g., greater than 5 degrees and less than or equal to 40 degrees, greater than 5 degrees and less than or equal to 40 degrees, greater than 5 degrees and less than or equal to 30 degrees, greater than 5 degrees and less than or equal to 20 degrees, greater than 5 degrees and less than or equal to 10 degrees). In embodiments, the angle 150 is substantially uniform around a circumference of the glass container 102 (e.g., when measured at a plurality of azimuthal orientations, each of the measurements may be within 0.5 degrees of one another). In existing glass containers, the angle 150 is typically around 3 degrees. As such, in the glass container 102, the inclination of the upper sealing surface 110 relative to the plane 152 is increased by at least 50% over existing glass containers.

The greater inclination of the upper sealing surface 110 may increase stopper compression at low storage temperatures, thereby increasing the sealing pressure between the stopper 106 and the upper sealing surface 110 of the flange 126. The angle 150 may create a compression gradient within the stopper 106 as a result of crimping the cap 108. For example, in embodiments, a compression of the stopper 106 may increase with increasing radial distance from the outer surface 134 such that the compression of the stopper is greater closer to the inner surface 114. Such greater compression with proximity to the inner surface 114 may prevent gaps from forming in the seal as the stopper 106 shrinks with cooling. The stopper 106 is compressed to a greater extent proximate to the opening 105 than at peripheral regions of the stopper 106 disposed near the outer surface 134 of the flange 126. Such greater compression results in a greater compression of the stopper 106 using the same crimping process, providing a higher tolerance for shrinkage of the stopper 106. Additionally, the inclined sealing surface 140 reduces the term $L_{i,stopper}$ in Equation 3 above proximate to the opening 105. This reduces the amount of shrinkage of the cap 108 that is necessary to maintain the relationship of Equation 1 herein.

Referring again to FIG. 3, in embodiments, the upper sealing surface 110 may extend in the plane 152 extending through the end 154 of the opening 105 in the glass container 102. In embodiments, the upper sealing surface 110 may extend substantially perpendicular (e.g., at an angle greater than or equal to 89.5 degrees and less than or equal to 90.5 degrees) to the center axis C of the glass container 102. Such an upper sealing surface 110 may increase the contact area between the stopper 106 (see FIG. 1A) and the upper sealing surface 110 and may increase the probability of maintaining integrity of the seal.

In embodiments, various additional characteristics of the upper sealing surface 110 and/or the inclined sealing surface 140 depicted in FIG. 2 may be tailored for maintaining a seal at storage temperatures less than or equal to −80° C. For example, in embodiments, the upper sealing surface 110 may comprise a surface roughness (e.g., Ra value) that is less than or equal to a threshold value (e.g., 0.1 μm, 50 nm, etc.). Such a low surface roughness may beneficially prevent the stopper 106 from pulling away from the upper sealing surface 110 upon cooling. In embodiments, the upper sealing surface 110 may be substantially free of defects (e.g., folds, bumps, ridges, etc.). Such defects may lead to gaps forming at the interface between the upper sealing surface 110 and the stopper 106, thereby reducing seal quality. A flatness of the inclined sealing surface 140 may be maintained within a threshold value to facilitate adherence between the stopper 106 and the upper sealing surface 110.

In embodiments, the upper sealing surface 110 comprises a surface roughness (e.g., Sa value) that is greater than or equal to a threshold value (e.g., 3 μm, 5 μm, 10 μm) to increase friction at the upper sealing surface 110 between the glass container 102 and the stopper 106. In such embodiments, the surface roughness of the upper sealing surface 110 may be relatively uniform throughout the entirety thereof. For example, Sa values of the upper sealing surface 110 throughout a plurality of different measurement windows (e.g., 100 μm by 100 μm) may vary by less than or equal 0.1 μm. In embodiments, the roughness of the upper sealing surface 110 may be determined based at least in part on properties (e.g., surface roughness) of the stopper 106. In embodiments, the roughness of the upper sealing surface 110 may approximately equal a difference in shrinkage between the metal-containing cap 108 and the combination of the flange 126 and stopper 106. For example, in embodiments, the surface roughness of the upper sealing surface 110 may be within a threshold value of the estimated shrinkage difference between the cap 108 and the combination of the stopper 106 and flange 126. Providing such a surface roughness may ensure at least some contact between the upper sealing surface 110 and the stopper 106 after cooling.

For example, in embodiments, a flange thickness 158 (e.g. distance between the upper sealing surface 110 and the underside surface 132) may be increased over existing glass containers. In such embodiments, if the stopper 106 and crimping process of the cap 108 is un-modified, the proportion of the combined height 138 of material enclosed by the cap 108 containing stopper 106 is reduced, thereby reducing the shrinkage of the cap 108 needed to satisfy Equation 1 described herein. Alternatively or additionally, the size of the stopper 106 (e.g., in terms of thickness of the sealing portion 119) may be reduced. In embodiments, the flange height 158 is greater than or equal to 4.0 mm and constitutes at least 61% of the combined height 138.

The features of the cap 108 disclosed herein may also be used in combination with compositional changes to the stopper 106 to further increase the seal pressure and contact area and decrease the probability of CCI failure. In embodiments, the composition of the stopper 106 may be chosen to lower the CTE or glass transition temperature thereof. Choosing such compositions for the stopper 106 may lower the shrinkage thereof and therefore help maintain compression of the stopper 106 via the cap 108. In embodiments, the polymer formulation of the stopper 106 may be chosen (or additions may be added to the stopper 106) such that the glass transition temperature of the stopper 106 is less than or equal to −45° C., less than or equal to −70° C., less than or equal to −75° C., less than or equal to −80° C., or even less than or equal to −85° C. In embodiments, the stopper 106 may comprise a polymer composition that has a glass transition temperature that is greater than or equal to −70° C. and less than or equal to −45° C. In embodiments, the glass transition temperature of the stopper 106 may be lowered to below a desired storage temperature of the sealed glass container 100 (e.g., to less than or equal to dry ice storage temperatures around −80° C.) such that the stopper 106 retains elasticity, creating the seal at the upper sealing surface 110. In embodiments, the stopper 106 may comprise one or more low $T_g$ elastomeric materials such as Polybutadienes, silicones, fluorosilicones, nitrites, and EPDM elastomers (e.g., PDMS), or any combination thereof. In embodiments the elastomeric material may comprise a material having a glass transition temperature that is less than or equal to −100° C.

In embodiments, the stopper 106 may comprise a polymer-based composite material having a lower CTE than typically used rubber materials. In embodiments, the stopper 106 may comprise a rubber-filler mixture. For example, in embodiments, the stopper 106 may comprise a polymer or rubber material and up to 15% by volume of filler material. In embodiments, the stopper 106 may comprise less than or equal to 40 wt. % filler material (e.g., less than or equal to 30 wt. % filler material). More than 40 wt. % filler material may diminish seal quality by lowering the elasticity of the stopper 106. The filler material may have a CTE that is less than that of the rubber out of which stoppers are typically constructed (e.g., less than or equal to $50\times10^{-7}$ $K^{-1}$, less than or equal to $20\times10^{-7}$ $K^{-1}$, less than or equal to $10\times10^{-7}$ $K^{-1}$, less than or equal to $5\times10^{-7}$ $K^{-1}$). In embodiments, the filler may comprise silicon. For example, in embodiments, the filler material may comprise $SiO_2$ glass particles having a particle size that is greater than or equal to 10 nm and less than or equal to 100 nm. In embodiments, the $SiO_2$ glass particles may be functionalized with oranosilanes to tune the particle dispersion state within the elastomeric material of the stopper 106. In embodiments, the filler material may comprise a silicate (e.g., cordierite, b-eucryptite, b-spodumene). In embodiments, the filler material may be a high melting point metal (e.g., Ir, W, Ti, Si). In embodiments, the filler material may comprise $Mg_2PO_4$. In embodiments, the filler material may comprises an oxide, such as $SiO_2$, Ti-doped $SiO_2$, $ZrW_2O_8$, or other ceramics in the $AM_2O_8$ family. In embodiments, the filler material may comprise any other suitable material with a relatively low or negative CTE. In embodiments, the CTE of the stopper 106 containing the filler material may be less than or equal to $300\times10^{-7}$ $K^{-1}$ (e.g., less than or equal to $290\times10^{-7}$ $K^{-1}$, less than or equal to $280\times10^{-7}$ $K^{-1}$, less than or equal to $270\times10^{-7}$ $K^{-1}$). By adding the filler material described herein to the stopper 106, the CTE of the stopper 106 may be reduced relative to the CTE of the metal cap 108, thereby reducing the likelihood of decompression of the stopper 106 when the sealed glass container 100 is cooled to storage temperatures that are less than or equal to −80° C.

It should be appreciated that any combination of the above-described approaches (e.g., increasing the CTE and/or stiffness of the cap 108, lowering the CTE and/or $T_g$ of the stopper 106, structurally modifying the glass container 102 in any of the ways described herein) may be used in the sealed glass container 100. In embodiments, both cap 108 comprising a high CTE greater than or equal to $260\times10^{-7}$ $K^{-1}$ and/or high stiffness of greater than or equal to 140 GPa (e.g., constructed of a polymer-aluminum composite) and low CTE stopper 106 (e.g., constructed of a rubber-$SiO_2$ composite) may be used. In such embodiments, given that the shrinkage differential between the metal-containing cap 108 and the stopper 106 is reduced by composition formulation, modification of the structure of the glass container 102 may be avoided.

The caps 108 disclosed herein may be incorporated into a method for sealing a glass container, such as a method of sealing a sealed pharmaceutical container. Referring again to FIG. 5, in embodiments, a method of sealing a sealed pharmaceutical container may include providing the glass container 102 comprising the shoulder 130, the neck 128 extending from the shoulder 130, and the flange 126 extending from the neck 128. The glass container 102 may be a pharmaceutical container and may include any of the features, compositions, or characteristics previously described herein for the glass container 102. The flange 126 may include an underside surface 132 extending from the neck 128, an outer surface 134 extending from the underside surface 132 and defining an outer diameter of the flange 126, and an upper sealing surface 110 extending between the outer surface 132 and the inner surface 114 of the sealed glass container 100. The inner surface 114 defines the opening 105 in the glass container 102. The methods may further include inserting a pharmaceutical composition into the glass container 102 and providing the sealing assembly 104 comprising the stopper 106 and the cap 108. The stopper 106 and cap 108 may have any of the features, materials, or characteristics previously described herein for the stopper 106 and cap 108, respectively.

The methods may further include inserting the stopper 106 into the opening 105 in the glass container 102 so that the stopper 106 extends over the upper sealing surface 110 of the flange 126 and covers the opening 105. The method may further include crimping the cap 108 over the stopper 106 and against the flange 126 to thereby compress the stopper 106 against the upper sealing surface 110. The methods may further include cooling the sealed glass container 100 to a temperature of less than or equal to −45° C., such as less than or equal to −80° C., less than or equal to −100° C., less than or equal to −120° C., or even less than or equal to −180° C. After the cooling of the sealed glass container 100, the compression is maintained on the upper sealing surface 110 such that a helium leakage rate of the sealed glass container 100 is less than or equal to $1.4\times10^{-6}$ $cm^3/s$ at the temperature.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A cap for a sealing a pharmaceutical glass container, the cap comprising:
- a cap skirt comprising an annular body and a crimp region at a first end of the annular body; and
- a top cover coupled to a second end of the cap skirt, the top cover comprising a solid disc or annular disc;
- wherein:
  - the crimp region comprises a crimpable metal;
  - the annular body of the cap skirt comprises a coefficient of thermal expansion (CTE) greater than a CTE of a metal consisting of aluminum, a stiffness greater than or equal to 2 times a stiffness of the crimp region, or both;
  - the CTE refers to the CTE over a temperature range of from −200° C. to 300° C.; and
  - stiffness is defined as a Young's modulus times a cross-sectional area divided by an axial length.

2. The cap of claim 1, wherein the CTE of the annular body of the cap skirt is greater than the CTE of the metal consisting of aluminum by a difference of at least $100\times10^{-7}$ $K^{-1}$.

3. The cap of claim 1, wherein the CTE of the annular body of the cap skirt is greater than or equal to $260\times10^{-7}$ $K^{-1}$.

4. The cap of claim 1, wherein the CTE of the annular body of the cap skirt is greater than or equal to $260\times10^{-7}$ $K^{-1}$ at a temperature less than or equal to −45° C.

5. The cap of claim 1, wherein the stiffness of the annular body of the cap skirt is greater than or equal to 2 times a stiffness of a comparable cap skirt annular body consisting of aluminum metal and having a radial thickness of 0.19 mm and identical axial length.

6. The cap of claim 1, further comprising a stopper, wherein the stiffness of the annular body of the cap skirt is within 30% of a stiffness of the stopper in a compressed state at temperatures less than or equal to the glass transition temperature $T_g$ of the stopper.

7. The cap of claim 1, wherein the annular body of the cap skirt has a Young's modulus of greater than or equal to 140 GPa, a radial thickness greater than or equal to 0.24 mm, or both.

8. The cap of claim 1, wherein the CTE of the annular body of the cap skirt is greater than $260\times10^{-7}$ $K^{-1}$ and the stiffness of the annular body is greater than 2 times a stiffness of a comparable cap skirt annular body consisting of aluminum metal and having a radial thickness of 0.19 mm and identical axial length.

9. The cap of claim 1, wherein the crimpable metal of the crimp region comprises aluminum or an aluminum alloy.

10. The cap of claim 1, wherein the annular body of the cap skirt comprises a metal or metal alloy having a CTE greater than the CTE of a metal consisting of aluminum.

11. The cap of claim 1, wherein the cap skirt comprises a polymer-metal composite structure.

12. The cap of claim 11, wherein the annular body of the cap skirt comprises a polymer material and the crimp region comprises the crimpable metal coupled to the polymer material of the annular body.

13. The cap of claim 12, wherein the polymer material of the annular body has a CTE of from $260\times10^{-7}$ $K^{-1}$ to $3{,}000\times10^{-7}$ $K^{-1}$.

14. The cap of claim 12, wherein the annular body of the cap skirt has a stiffness that is greater than or equal to 80% of a stiffness of a comparable cap skirt annular body consisting of aluminum metal and having a radial thickness of 0.19 mm and identical axial length.

15. A sealed pharmaceutical container comprising:
- a glass container comprising a shoulder, a neck extending from the shoulder, and a flange extending from the neck, the flange comprising:
  - an underside surface extending from the neck;
  - an outer surface extending from the underside surface, the outer surface defining an outer diameter of the flange; and
  - a sealing surface extending between the outer surface and an inner surface defining an opening in the sealed pharmaceutical container;
- a sealing assembly comprising a stopper extending over the sealing surface of the flange of the glass container and covering the opening, and the cap of claim 1, wherein:
  - the cap secures the stopper to the flange; and
  - the sealing assembly maintains a helium leakage rate of the sealed pharmaceutical container of less than or equal to $1.4\times10^{-6}$ $cm^3/s$ as the sealed pharmaceutical container is cooled to a temperature of less than or equal to −45° C.

16. The sealed pharmaceutical container of claim 15, wherein the stopper has a glass transition temperature ($T_g$) that is greater than or equal to −70° C. and less than or equal to −45° C.

17. The sealed pharmaceutical container of claim 15, wherein a glass transition temperature of the stopper is less than or equal to −75° C.

18. The sealed pharmaceutical container of claim 15, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

19. The sealed pharmaceutical container of claim 15, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −100° C.

20. The sealed pharmaceutical container of claim 15, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −120° C.

21. The sealed pharmaceutical container of claim 15, wherein the glass container is constructed of a glass composition having a coefficient of thermal expansion that is greater than or equal to 0 and less than or equal to $70\times10^{-7}$ $K^{-1}$.

22. The sealed pharmaceutical container of claim 15, wherein an absolute value of the difference between the CTE of the cap skirt and a CTE of the stopper is less than or equal to $50\times10^{-7}$ $K^{-1}$.

23. The sealed pharmaceutical container of claim 15, wherein the CTE of the annular body of the cap skirt is greater than a CTE of the stopper.

24. The sealed pharmaceutical container of claim 15, wherein the annular body of the cap skirt has a stiffness that is within 30% of a stiffness of the compressed rubber stopper at temperatures less than or equal to the glass transition temperature $T_g$ of the stopper.

25. The sealed pharmaceutical container of claim 15, wherein the sealed pharmaceutical container maintains the helium leakage rate at is less than or equal to $1.4\times10^{-6}$ $cm^3/s$ as it is cooled to the temperature at a rate of less than or equal to 5° C. per minute.

26. The sealed pharmaceutical container of claim 25, wherein the cap maintains continuous compression of the stopper against the flange of the glass container as the sealed pharmaceutical container is cooled.

27. A method of sealing a sealed pharmaceutical container, the method comprising:

providing a pharmaceutical container comprising a shoulder, a neck extending from the shoulder and a flange extending from the neck, the flange comprising:

an underside surface extending from the neck;

an outer surface extending from the underside surface and defining an outer diameter of the flange; and an upper sealing surface extending from the outer surface to an inner surface of the sealed pharmaceutical container, wherein the inner surface defines an opening;

inserting a pharmaceutical composition into the pharmaceutical container;

providing a sealing assembly comprising a stopper and the cap of claim 1;

inserting the stopper into the opening so that the stopper extends over the upper sealing surface of the flange and covers the opening;

crimping the cap over the stopper and against the flange to thereby compress the stopper against the upper sealing surface; and cooling the sealed pharmaceutical container to a temperature of less than or equal to −45° C., wherein, after the cooling of the sealed pharmaceutical container, the compression is maintained on the sealing surface such that a helium leakage rate of the sealed pharmaceutical container is less than or equal to $1.4\times10^{-6}$ $cm^3/s$ at the temperature.

* * * * *